United States Patent
Shibata et al.

(10) Patent No.: US 7,212,028 B2
(45) Date of Patent: May 1, 2007

(54) SIGNAL RECEIVING CIRCUIT

(75) Inventors: Osamu Shibata, Nishinomiya (JP); Toru Iwata, Osaka (JP); Yoshiyuki Saito, Katano (JP); Satoshi Takahashi, Hirakata (JP); Wataru Itoh, Kyoutanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 136 days.

(21) Appl. No.: 11/038,436

(22) Filed: Jan. 21, 2005

(65) Prior Publication Data
US 2005/0162184 A1    Jul. 28, 2005

(30) Foreign Application Priority Data
Jan. 22, 2004    (JP)    ............... 2004-013939

(51) Int. Cl.
*H03K 17/16*    (2006.01)
*H03K 19/003*    (2006.01)

(52) U.S. Cl. ............... 326/30; 326/32; 326/33; 326/34

(58) Field of Classification Search ............ 326/30–34
See application file for complete search history.

(56) References Cited

U.S. PATENT DOCUMENTS

| | | | |
|---|---|---|---|
| 5,504,782 A * | 4/1996 | Campbell, Jr. | ............... 375/259 |
| 6,486,696 B1 * | 11/2002 | Cao | ............... 326/30 |
| 6,556,039 B2 | 4/2003 | Nagano et al. | |
| 2004/0046587 A1 * | 3/2004 | Lindsay et al. | ............... 326/30 |

FOREIGN PATENT DOCUMENTS

JP    2002-344300    11/2002

* cited by examiner

*Primary Examiner*—Anh Q. Tran
(74) *Attorney, Agent, or Firm*—Wenderoth, Lind & Ponack, L.L.P.

(57) ABSTRACT

First and second transmission lines and are connected to each other in series. A first terminator is connected to the first transmission line in parallel, and is provided externally of a semiconductor device. A second terminator is connected to the second transmission line in parallel, and is provided inside the semiconductor device. The values of the first and second terminator are adjusted so that the combined resistance value of first and second terminator and the second transmission line matches with the impedance of the first transmission line. Impedance matching of the entire transmission line can be achieved with this simple construction, thus, a stable, high quality signal can be transmitted.

6 Claims, 16 Drawing Sheets

SIGNAL RECEIVING CIRCUIT

BACKGROUND OF THE INVENTION

1. Technical Field

The present invention relates to an AV signal receiving circuit which transmits and receives signals containing audio and video information in high quality, and an audio and video receiving apparatus containing the same.

2. Description of Related Art

Recently, as AV equipment such as DVD recorders and televisions have advanced, there have been demands for technology for transmitting high definition baseband audio/video signals using a high-speed interface. Exemplary standards among high-speed interfaces are DVI (Digital Visual Interface) and HDMI (High-Definition Multimedia Interface). DVI is a standard used for digital transmission of video signals to a LCD or a CRT. HDMI is a digital interface standard for next-generation television which has additional functions for home-use electric equipment and downward compatibility based on DVI. These standards can be used as high-speed interfaces.

However, high frequency audio/video signals are used in cases where the audio/video signal is transmitted for connection between LSIs or between devices at high speed by using these high-speed interfaces. Accordingly, the distances that signals pass through a signal transmission circuit, a signal receiving circuit and a transmission line cannot be ignored. Accordingly, it is necessary to introduce the concept of distance and to take the impedance of transmission line for high frequency signals into consideration. When the impedance of a signal source does not match with the impedance of a load, a portion of the signals from a signal source will be reflected without being transmitted to the load side, in other words, the so-called reflection phenomenon will occur. As a result, noise which is produced due to the reflection phenomenon may be large and cannot be ignored. In this case, operation will be adversely affected, for example, a malfunction of the device will occur.

To solve these problems, a method for preventing reflection by matching the impedances between transmission line and LSI or device on the transmission end or the receiving end is generally used. FIG. 13 is a conceptual diagram showing the impedance matching principle of a transmission line. The impedance of a transmission line 1300 is Zo ($\Omega$). A terminator 1301 for matching the impedance Zo of the transmission line 1300 is Rout ($\Omega$). The terminator 1301 corresponding to the transmission line 1300 is connected in parallel relative to the transmission line 1300, as shown in FIG. 13. The value of terminator 1301 is adjusted so that the impedance Zo of transmission line 1300 and the impedance Rout of terminator 1301 are equal. In this case, the transmission line 1300 with characteristic impedance Zo is considered as equivalent to a line which extends infinitely. Theoretically, reflection does not occur.

FIG. 14 shows one example in which the impedances are matched based on the impedance matching principle in a signal receiving circuit employing a transmission line and a semiconductor device. As shown in FIG. 14, a terminator 1401 for impedance matching of a transmission line 1400 and a semiconductor receiving device 1405 is provided externally of the semiconductor receiving device 1405. The terminator 1401 has a resistance value equal to the impedance Zo of the transmission line 1400. In the method of FIG. 14, since the terminator is provided externally, the area of a printed circuit board where a signal receiving circuit 14 is wired will be large.

To reduce the area of a printed circuit board where a signal receiving circuit will be wired, a terminator is provided internally in FIG. 15. That is, FIG. 15 shows another example in which the impedances are matched based on the impedance matching principle in a signal receiving circuit employing a transmission line and a semiconductor device. As shown in FIG. 15, a terminator 1503 for impedance matching of a transmission line 1500 and a semiconductor receiving device 1505 is provided inside the semiconductor receiving device 1505. The impedance Zo of the transmission line 1500 and the impedance Rin of the terminator 1503 are equal. In the method, since the terminator is provided internally, the area of a printed circuit board where a signal receiving circuit is wired is smaller than the case shown in FIG. 14. However, since the terminator is provided internally in this method, its resistance value varies with voltage variation, temperature variation and the characteristics of the manufacturing process. For this reason, it is difficult to achieve impedance matching of the transmission line 1500.

To solve these problems, a technology in which a terminator of variable resistance is provided in a semiconductor receiving device 1605 is disclosed in Japanese unexamined patent application publication 2002-344300. FIG. 16 shows an example of this disclosure. Specifically, a plurality of sets of CMOS transistors and resistors are connected to a transmission line 1600 in parallel. The CMOS transistor and the resistor are connected in series in each set. The respective gate lines of the CMOS transistors are connected to a switch control portion. A detection portion for detecting the voltage and temperature characteristics is connected in the previous stage relative to the switch control portion. Operation of FIG. 16 will now be described. First, when the detection portion detects voltage variation or temperature variation, or additionally detects deviation of the resistance value due to the manufacturing process, the detection portion transmits a command signal in accordance with the situation to the switch control portion. The switch control portion determines a suitable resistance value of the variable resistor based on the command signal. Then, the switch control portion transmits ON/OFF switching signals for setting the suitable resistance to the CMOS transistors. Accordingly, the CMOS transistors turn ON/OFF according to the signals, thus, the terminator Rin is set to the suitable resistance value.

However, these impedance matching methods have the following problems.

In the method of FIG. 14, the terminator 1401 and the semiconductor device 1405 are branched and are connected through a small transmission line 1406 such as an input/output lead and an electrode wire. That is, the small transmission line 1406 and the small terminator 1401 appear to be connected to the transmission line 1400 in parallel. Accordingly, as shown in the impedance graph of FIG. 14, reduction of the impedance of the small transmission line 1406 appears. As a result, impedance mismatching occurs. Therefore, reflection cannot be suppressed.

In the method of FIG. 15, since the terminator 1503 is provided internally, its resistance value varies with voltage variation, temperature variation and the characteristics of the manufacturing process. For this reason, it is difficult to achieve impedance matching of the transmission line 1500. In addition, since there is no component for impedance matching of the small transmission line 1506, impedance mismatching occurs.

In Japanese unexamined patent application publication 2002-344300, impedance mismatching occurs caused by the impedance of the small transmission lines 1606 such as an input/output lead and an electrode wire. In addition, since a variable resistor is provided internally as the terminator, a mechanism for adjusting the resistance value of terminator such as a switch control portion, or a detection portion for detecting voltage and temperature characteristics is required. Accordingly, the circuit construction of the whole device is complicated. Generally, a variable resistor is formed by using CMOS transistors, as shown in FIG. 16. A CMOS transistor has a capacitive component between the drain and the gate, or between the gate and the source. For this reason, the frequency characteristics of the variable terminator is poor. Thus, its resistance value varies depending on the frequency of signal. Accordingly, as shown in an impedance graph of FIG. 16, the impedance corresponding to the CMOS transistors locally reduces, and the impedance Zo of the transmission line 1600 is not constant.

SUMMARY OF THE INVENTION

The present invention is made to solve these problems, and provides impedance matching of the entire transmission line (including a small transmission line), with a simple circuit construction. Furthermore, the present invention provides a signal receiving circuit which cancels the variation of a terminator provided in a semiconductor receiving device and which has excellent frequency characteristics, as well as an audio and video receiving apparatus including the same.

To solve the above problems, a signal receiving circuit of a first aspect includes first and second transmission lines, a semiconductor device, and first and second terminators. In this signal receiving circuit, the first and second transmission lines are connected to each other in series. The semiconductor device receives a signal through the first and second transmission lines. The first terminator is connected to the first transmission line in parallel and provided externally of the semiconductor device. The second terminator is connected to the second transmission line in parallel and provided in the semiconductor device.

This simple construction can match the impedance Zo of the first transmission line with the impedance of the entire transmission line viewed from the first transmission line. Accordingly, the impedance of the entire transmission line viewed from the first transmission line is a constant value. As a result, it is possible to prevent reflection of signals, and to transmit a stable, high quality signal without distorting the signal waveform. Furthermore, since an element with a capacitive component is not employed to combine the impedance Zo of the first transmission line with the impedance of the entire transmission line viewed from the first transmission line, the frequency characteristics are excellent even in the transmission of high frequency signals.

In the circuit of a second aspect according to the first aspect, the respective resistance values Rout and Rin of the first and second terminators are adjusted so that the combined resistance value Rt1 of the first and second terminators and the second transmission line matches with the impedance value Zo of the first transmission line.

This simple construction can match the impedance Zo of the first transmission line with the combined resistance Rt1. Accordingly, the impedance of the entire transmission line viewed from the first transmission line is a constant value. As a result, it is possible to prevent reflection of signals, and to transmit a stable, high quality signal without distorting the signal waveform. Furthermore, since an element with a capacitive component is not employed to combine the impedance Zo of the first transmission line with the combined resistance value Rt1, the frequency characteristics are excellent even in the transmission of high frequency signals.

In the signal receiving circuit of a third aspect according to the first aspect, the second transmission line includes a first series resistor which is connected in series to and provided externally of the semiconductor device. In this signal receiving circuit, the respective resistance values Rout, Rin and Rs1 of the first and second terminators and the first series resistor are adjusted so that the combined resistance value Rt2 of the first and second terminators, the impedance of the second transmission line, and the first series resistor matches with the impedance value Zo of the first transmission line.

When the impedance value Zo of the first transmission line is higher than the impedance value Zo' of the second transmission line (Zo>Zo'), the first series resistor is inserted in the second transmission line in series. The respective resistance values Rout, Rin and Rs1 of the first second terminators, and the first series resistor are adjusted so that the combined resistance value Rt2 of the combined resistance Rt1 and the first series resistor Rs1 matches with the impedance Zo of the first transmission line. Accordingly, even when the impedance value Zo of the first transmission line is larger than impedance value Zo' of the second transmission line, and the impedance matching of the entire transmission line cannot achieved only by two terminators of the first and second terminators with the resistance values Rout and Rin, the impedance of the entire transmission line can be a substantially constant value.

In the signal receiving circuit of a fourth aspect according to the first aspect, the first transmission line includes a second series resistor which is connected to the second transmission line in series. In this signal receiving circuit, the respective resistance values Rout, Rin and Rs2 of the first and second terminators and the second series resistor are adjusted so that the combined resistance value Rt3 of the first and second terminators, the impedance of the second transmission line, and the second series resistor matches with the impedance value Zo of the first transmission line.

When the impedance value Zo of the first transmission line is higher than the combined resistance value Rt1 (Zo>Rt1), the second series resistor is inserted in the first transmission line in series. The respective resistance values Rout, Rin and Rs2 of the first and second terminators, and the second series resistor are adjusted so that the combined resistance value Rt3 obtained by adding the resistance value Rs2 of the second series resistor to the combined resistance value Rt1 matches with the impedance value Zo of the first transmission line. Accordingly, when the impedance matching cannot achieved only by the respective resistance values Rout and Rin of the first and second terminators, and the relationship between the impedance Zo of the first transmission line and the combined resistance Rt1 is Zo>Rt1, the impedance of the entire transmission line can be adjusted to the constant value Zo. Moreover, this construction can make the impedance uniform more easily than the third aspect in which the first series resistor is inserted, when the first transmission line Zo is higher than the second transmission line Zo'.

The signal receiving circuit of a fifth aspect according to the first aspect further includes a first electrostatic discharge protection component which is connected to the second transmission line in parallel and provided externally of the semiconductor device. In this signal receiving circuit, the respective resistance values Rout and Rin of the first and second terminators are adjusted so that the combined resistance Rt4 of the first and second terminators and the impedance of the second transmission line matches with the impedance value Zo of the first transmission line.

In order to prevent breakdown of the semiconductor device due to high voltage, high frequency noise due to static electricity or the like, an electrostatic discharge protection component is often inserted in the circuit. Such an electrostatic discharge protection component has a capacitive component. For this reason, the impedance of the part where the electrostatic discharge protection component is inserted decreases, thus, impedance mismatching occurs. Accordingly, the first electrostatic discharge protection component is inserted to the second transmission line in parallel, the respective resistance value Rout and Rin of the first and second terminators are adjusted so that the combined resistance value Rt4 corresponding to the combined resistance value Rt1 matches with the impedance value Zo of the first transmission line. The electrostatic discharge protection component prevents breakdown of the semiconductor device due to noise. Additionally, the impedance of the entire transmission line is substantially constant. As a result, it is possible to prevent reflection of signals in the entire transmission line.

The signal receiving circuit of a sixth aspect according to the fifth aspect further includes a coil which is connected in series relative to the first terminator. In this signal receiving circuit, the respective resistance values Rout and Rin of the first and second terminators are adjusted so that the combined resistance value Rt5 of the first and second terminators, and the impedance of the second transmission line matches with the impedance value Zo of the first transmission line.

When an electrostatic discharge protection component is inserted in a circuit, since the electrostatic discharge protection component has a capacitive component, the impedance of a part where the electrostatic discharge protection component is inserted decreases in a quadric curve. Particularly, when the capacitive component of electrostatic discharge protection component is large, the local impedance is reduced more. For this reason, the first terminator and the second terminator cannot achieve impedance matching by themselves. On the other hand, a coil has a characteristic that increase the impedance in a quadric curve. When a coil is inserted in the first terminator in series to use this characteristic, the impedance of the electrostatic discharge protection component and the impedance of the coil are canceled. Accordingly, the electrostatic discharge protection component prevents breakdown of the semiconductor device due to noise, and the coil compensates for the change of the impedance due to the electrostatic discharge (DSD). As a result, it is possible to keep the impedance constant, and to transmit a stable, high quality signal without distorting the signal waveform.

The signal receiving circuit of a seventh aspect according to the first aspect further includes a second electrostatic discharge protection component which is connected to the first transmission line in parallel. In this signal receiving circuit, the respective resistance values Rout and Rin of the first and second terminators are adjusted so that the combined resistance value Rt6 of the first and second terminators, and the impedance of the second transmission line matches with the impedance value Zo of the first transmission line.

In order to prevent breakdown of the semiconductor device due to high voltage, high frequency noise due to static electricity or the like, an electrostatic discharge protection component is often inserted in the circuit. Such an electrostatic discharge protection component has a capacitive component. For this reason, the impedance of a part where the electrostatic discharge protection component is inserted decreases, thus, impedance mismatching occurs. Accordingly, the electrostatic discharge protection component is inserted to the first transmission line in parallel, the respective resistance value Rout and Rin of the first and second terminators are adjusted so that the combined resistance value Rt6 corresponding to the combined resistance value Rt1 matches with the impedance Zo of the first transmission line. The electrostatic discharge protection component prevents breakdown of the semiconductor device due to noise, and the impedance of the entire transmission line is substantially constant. It is possible to prevent reflection of signals in the entire transmission line.

The signal receiving circuit of an eighth aspect according to the seventh aspect further includes a coil which is connected to the first terminator in series. In this signal receiving circuit, the respective resistance values Rout and Rin of the first and second terminators are adjusted so that the combined resistance value Rt7 of the first and second terminators, and the impedance of the second transmission line matches with the first transmission line Zo.

When an electrostatic discharge protection component is inserted in a circuit, since the electrostatic discharge protection component has a capacitive component, the impedance of a part where the electrostatic discharge protection component is inserted decreases in a quadric curve. Particularly, when the capacitive component of electrostatic discharge protection component is large, the local impedance is reduced more. For this reason, the first terminator and the second terminator cannot achieve impedance matching by themselves. On the other hand, a coil has the characteristic that increase the impedance in a quadric curve. When a coil is inserted in series relative to the first terminator to use this characteristic, the impedance of the electrostatic discharge protection component and the impedance of the coil are canceled. Accordingly, the electrostatic discharge protection component prevents breakdown of the semiconductor device due to noise, and the coil compensates the change of the impedance due to the electrostatic discharge (DSD). As a result, it is possible to keep the impedance in the entire transmission line constant, and to transmit a stable, high quality signal without distorting the signal waveform.

The signal receiving circuit of a ninth aspect according to the first aspect includes third and fourth transmission lines, third and fourth terminators, and a differential signal receiving circuit. In this signal receiving circuit, the third transmission line transmits a signal with phase inverted relative to the first transmission line, and the fourth transmission line is connected to the third transmission line in series and transmits a signal with phase inverted relative to the second transmission line, The third terminator is connected to the third transmission line in parallel and provided externally of the semiconductor device. The fourth terminator is connected to the fourth transmission line in parallel and provided inside the semiconductor device. The semiconductor device has the differential signal receiving circuit, and further receives a signal through the third and fourth transmission lines. The respective resistance values Rout18, Rout28, Rin18 and Rin28 of the first, second, third and fourth terminators are adjusted so that the combined resistance value Rt8 of the first, second, third and fourth terminators, and the second transmission line matches with the combined impedance value Zo of the first and third transmission lines.

Even when the differential receiving circuit is included, impedance matching in the entire transmission line can be achieved with a simple construction. As a result, in transmission of two phase-inverted signals it is possible to prevent reflection of each signal, and to transmit stable, high quality signals without distorting the signal waveforms.

The signal receiving circuit of a tenth aspect according to the ninth aspect further includes a common-mode filter. In this signal receiving circuit, the common-mode filter is connected to the first and second transmission lines in series and is connected to the third and fourth transmission lines in series. The respective resistance values Rout19, Rout29, Rin19 and Rin29 of the first, second, third and fourth terminators are adjusted so that the combined resistance value Rt9 of the first, second, third and fourth terminators, the second transmission line, and the common-mode filter matches with the combined impedance value Zo of the first and third transmission lines.

In order to prevent breakdown of the semiconductor device due to high voltage, high frequency noise due to static electricity or the like, a common-mode filter is often employed in a circuit with a differential signal receiving circuit. Such a common-mode filter has very high impedance. For this reason, the impedance of a part where the common-mode filter is inserted increases, thus, impedance mismatching occurs. Accordingly, the respective resistance values of the terminators are adjusted so that the combined resistance Rt9 of the respective resistance values of first, second, third and fourth terminators, and the impedance value of the common-mode filter matches with the impedance Zo of the first transmission line. Breakdown of the semiconductor device due to noise is prevented by inserting the common-mode filter, and the impedance of the entire transmission line can be kept substantially constant. It is possible to prevent reflection of signals in the entire transmission line.

An audio and video receiving apparatus of a eleventh aspect includes the signal receiving circuit according to the first aspect, and a controller which provides a signal received by the signal receiving circuit to an output device.

A stable, high quality signal can be transmitted without distorting the signal waveform. The signal receiving circuit of the first aspect is applied to an audio and video receiving apparatus, thus, high quality audio and video signals are transmitted. Therefore, it is possible to provide an audio and video receiving apparatus with high quality audio and video.

According to a signal receiving circuit of the present aspect, it is possible to match the impedance of a transmission line with the impedance of a small transmission line, such as an input/output lead or an electrode wire which connects a semiconductor device to the transmission line, with a simple mechanism. Therefore, it is possible to achieve transmission of a stable, high quality signal without distorting the signal waveform.

DETAILED DESCRIPTION

Embodiments according to the present invention are described with reference to FIGS. 1 to 12.

First Embodiment

Figure 1:
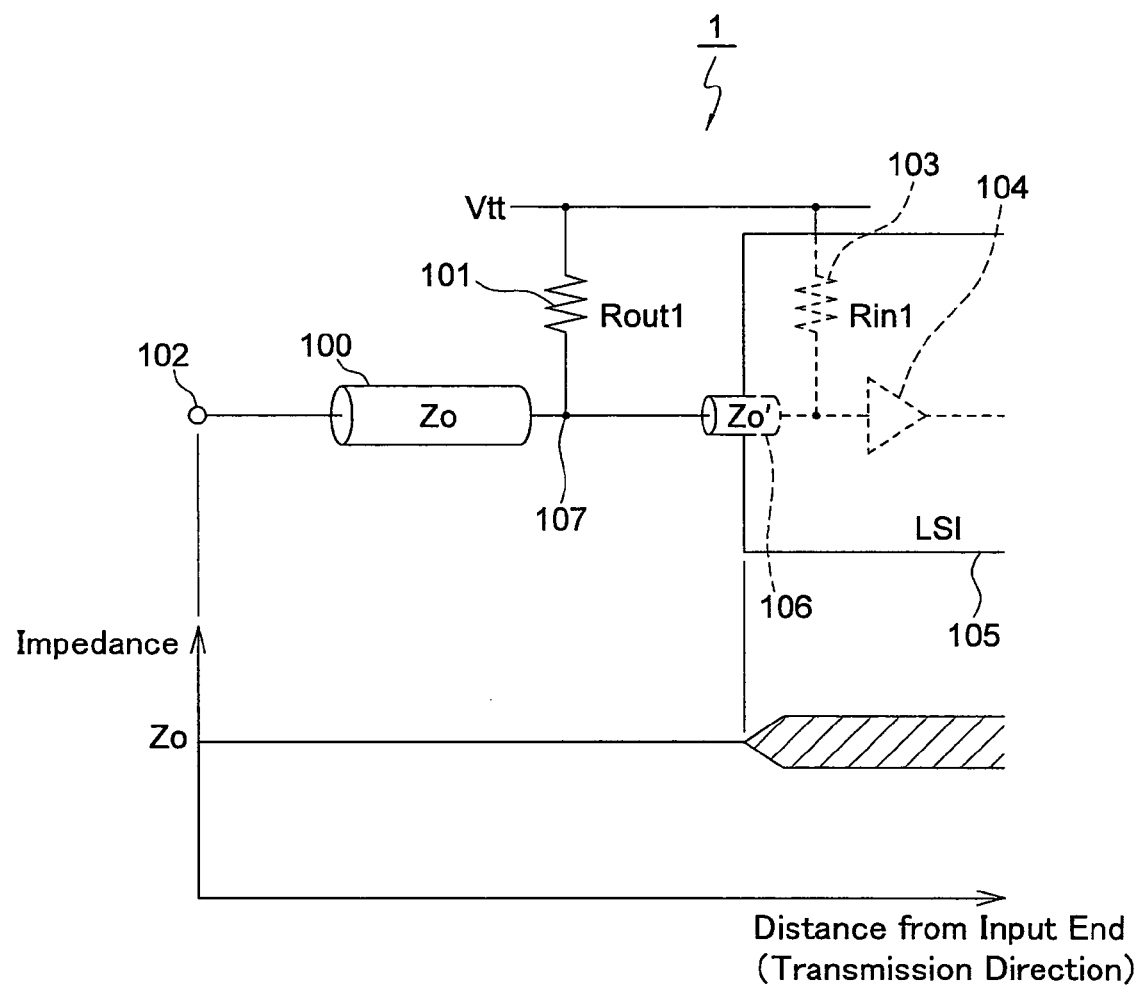
FIG. 1 shows a circuit diagram of a signal receiving circuit according to a first embodiment, and an impedance graph thereof.

FIG. 1 shows a schematic diagram of a signal receiving circuit according to a first embodiment of the present invention, and an impedance graph thereof. This signal receiving circuit is provided on a printed circuit board, for example. A semiconductor device used for AV equipment such as a DVD recorder and a TV is provided in the output side of the signal receiving circuit. Various signals, such as audio signals and the video signals, provided from the input end of the signal receiving circuit are provided to the semiconductor device.

1-1. Construction

The signal receiving circuit 1 of FIG. 1 includes a first transmission line 100, a second transmission line 106, a semiconductor device 105, a first terminator 101, and a second terminator 103. The first transmission line 100 is a wire on the printed circuit board (not shown), and has an input end 102 for signals. The second transmission line 106 includes an input/output lead and an electrode wire of the semiconductor device 105. The second transmission line 106 and the first transmission line 100 are connected to each other in series. The semiconductor device 105 includes a receiver 104 for receiving signals. The receiver 104 is connected to the second transmission line 106 in series, and receives the signals through the first and second transmission lines 100 and 106. The first terminator 101 is connected to the first transmission line 100 in parallel, and is provided externally of the semiconductor device 104. The second terminator 103 is provided inside the semiconductor device 105, and is connected to the second transmission line 106 in parallel. One end of each of the first and second terminators 101 and 103 is connected to the power supply Vtt.

Although the signal receiving circuit 1 employing one each of the first terminator 101 and the second terminator 103 is shown in FIG. 1, the signal receiving circuit may employ a plurality of resistors. The potential of the power supply Vtt is not specifically limited, and may be grounded.

1-2. Impedance Matching

How impedance matching is achieved in the signal receiving circuit 1 of FIG. 1 will now be described. In the signal receiving circuit 1, the resistance value Rt1 of the combined resistance in the output side viewed from the first transmission line 100 matches with the input impedance Zo of the first transmission line 100 (Rt1≈Zo). The combined resistance value Rt1 is the combined resistance value of the first and second terminators 101 and 103 and the second transmission line 106. That is, in the signal receiving circuit 1, the following two resistance values which affect the combined resistance value Rt1 are adjusted so as to achieve impedance matching in the entire transmission line.

(a) The resistance value Rout1 of the first terminator 101
(b) The resistance value Rin1 of the second terminator 106

Specifically, first, the resistance value Rin1 of the second terminator 103 is adjusted so as to be equal to the input impedance Zo' of the second transmission line 106. Accordingly, it can be thought that the impedance of the second transmission line 106 is the constant value Zo'.

The resistance value Rout1 of the first terminator 101 is adjusted to the value calculated based on the following equation (1). The following equation (1) shows the condition where the combined resistance value Rt1 in the output side viewed from the first transmission line 100 matches with the input impedance Zo of the first transmission line 100.

Equation (1) (1)

$$Rt1 = \frac{Rout1 \times Rin1}{Rout1 + Rin1} \approx Zo$$

The above equation (1) is transformed, thus, the resistance value Rout1 of the first terminator 101 can be represented by the following equation (2).

Equation (2) (2)

$$Rout1 = \frac{Rin1 \times Rt1}{Rin1 - Rt1}$$

When the resistance value Rout1 of the first terminator 101 is adjusted to the value obtained by the above equation (2), the impedance over the entire transmission line can be substantially set to the constant value Zo. Therefore, it is possible to suppress reflection of signals and noise generated due to the reflection.

The impedance graph of FIG. 1 shows the relationship between the distance from the input end 102 in the signal transmission direction, and the impedance. When the resistance value Rout1 of the first terminator 101 and the resistance value Rin1 of the second terminator 103 are adjusted as mentioned above, the impedance is substantially constant over the entire transmission line. In the impedance graph, the diagonally shaded area corresponding to the position of the semiconductor device 105 represents the deviation of impedance due to the manufacturing process of the semiconductor device 10S. This deviation occurs because the element provided inside the semiconductor device 105 is limited in size or design, it is miniaturized. For this reason, deviation tends to occur in the element characteristics. As a result, the deviation of the impedance shown in the figure occurs as the sum of the deviation values of the respective impedances of the elements.

1-3. Effect

In this embodiment, the first terminator 101 and the second terminator 103 are connected to the first transmission line 100 and the second transmission line 106 in parallel, respectively. This simple construction can match the impedance Zo of the first transmission line 100 with the output side combined resistance value Rt1 viewed from the first transmission line 100. As a result, since the impedance of the entire transmission line is constant, reflection of signals can be prevented. Accordingly, it is possible to stably transmit high quality signals without distorting signal waveforms. Furthermore, since neither a capacitor nor a coil is employed to match the input impedance Zo of the first transmission line 100 with the output side combined resistance value Rt1, the frequency characteristics of the signal receiving circuit are preferable even in the transmission of high frequency signals.

Second Embodiment 2-1. Construction

Figure 2:
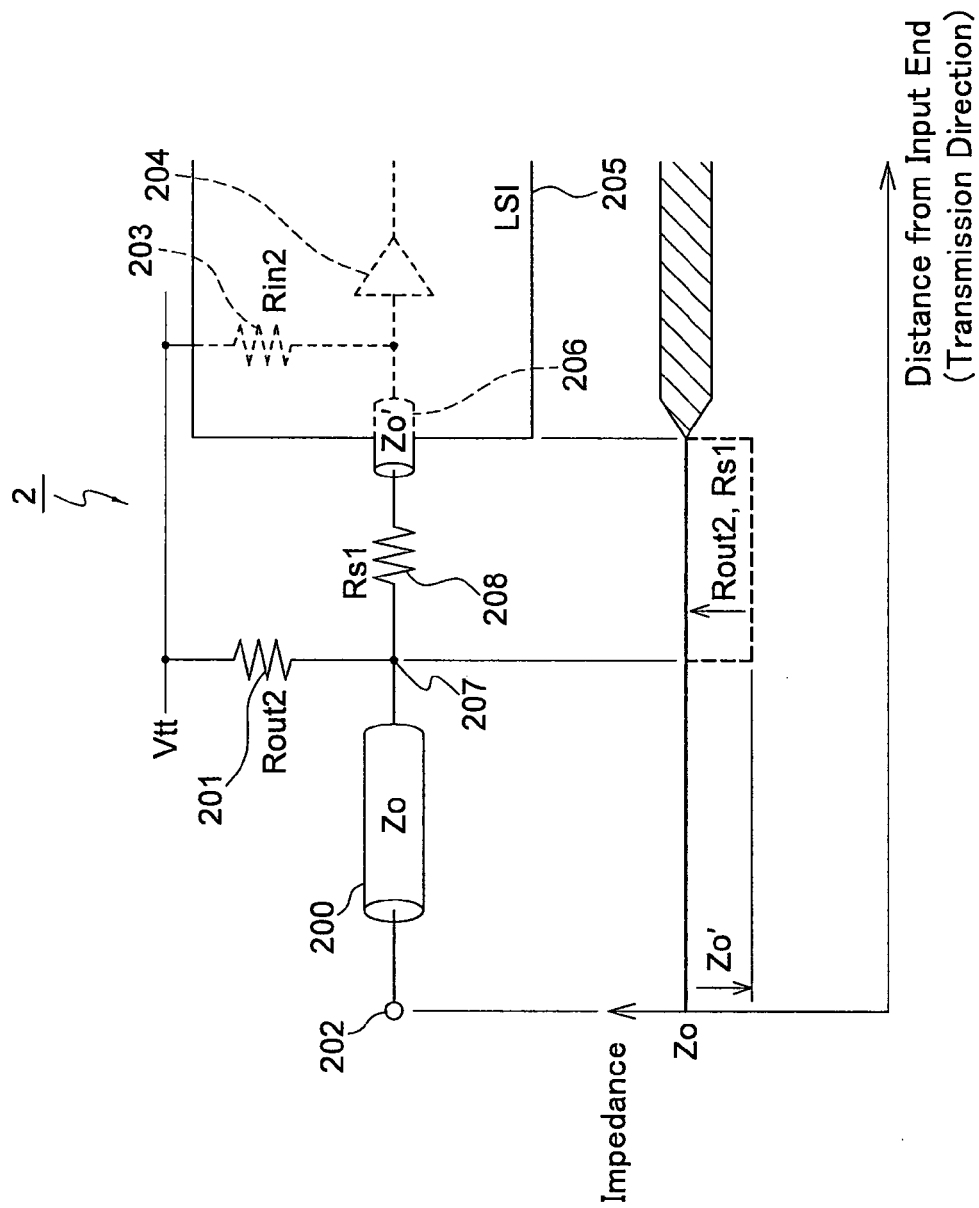
FIG. 2 shows a circuit diagram of a signal receiving circuit according to a second embodiment, and an impedance graph thereof.

FIG. 2 shows a schematic diagram of a signal receiving circuit according to a second embodiment of the present invention, and an impedance graph. In cases where the impedance value Zo of a first transmission line 200 is higher than the impedance value Zo' of a second transmission line 206 (Zo>>Zo'), the signal receiving circuit 2 of this embodiment is preferable.

The signal receiving circuit 2 of FIG. 2 has a first series resistor 208 on the second transmission line 206. The first series resistor 208 is connected to the semiconductor device 205 in series, and is provided externally of the semiconductor device 205. The other construction of this signal receiving circuit 2 is similar to the first embodiment. That is, the first transmission line 200 and the second transmission line 206 are connected in series. A receiver 204 provided inside the semiconductor device 205 is connected to the second transmission line 206 in series. A first terminator 201 with resistance value Rout2 is connected to the first transmission line 200 in parallel, and is provided externally of the semiconductor device 205. A second terminator 203 with resistance value Rin2 is provided inside the semiconductor device 205, and is connected to the second transmission line 206 in parallel. One end of each of the first and second terminators 201 and 203 is connected to the power supply Vtt.

The potential of the power supply Vtt is not specifically limited, and may be grounded.

2-2. Impedance Matching

How impedance matching is achieved in the signal receiving circuit 2 of FIG. 2 will now be described. First, the problem in cases where the first series resistor 208 is not provided will be described, then, the cases where it is provided will be described.

2-2-1. No First Series Resistor Present

First, cases where the first series resistor 208 is not provided in the signal receiving circuit 2 of FIG. 2 will be described. These cases correspond to cases where the impedance Zo of the first transmission line 100 is higher than the impedance Zo' of the second transmission line 106 (Zo>>Zo') in the aforementioned signal receiving circuit 1 of FIG. 1. Since cases correspond to cases where Rout1 in the foregoing equation (1) is large, the combined resistance value Rt1 can be approximated by the following equation (3). That is, the value of the impedance Rt1 in the output side viewed from the first transmission line 100 is "Rin1". Accordingly, the impedance cannot be set to the constant value Zo over the entire transmission line. For this reason, in the case of Zo>>Zo', it is found that the first terminator 201 and the second terminator 203 cannot completely achieve impedance matching only by themselves.

Equation (3)

$$Rt1 \approx Rin1 \qquad (3)$$

2-2-2. First Series Resistor Present

On the other hand, in the signal receiving circuit 2 of FIG. 2, the resistance value Rt2 of the combined resistance in the output side viewed from the first transmission line 200 matches with the input impedance Zo of the first transmission line 200. The combined resistance value Rt2 is the combined resistance value of the first and second terminators 201 and 203, the second transmission line 206, and a first series resistor 208. That is, in the signal receiving circuit 2, the following three resistance values which affect the combined resistance value Rt2 are adjusted so as to achieve impedance matching.

(a) The resistance value Rout2 of the first terminator 201
(b) The resistance value Rin2 of the second terminator 203
(c) The resistance value Rs1 of the first series resistor 208

Specifically, first, the resistance value Rin2 of the second terminator 203 is adjusted so as to be equal to the impedance value Zo' of the second transmission line 206. Accordingly, it can be thought that the impedance of the second transmission line 206 is the constant value Zo'.

The resistance value Rs1 of the first series resistor 208 is adjusted based on the following equation (4). The following equation (4) shows the condition where the combined resistance value Rt2 in the output side viewed from the first transmission line 200 matches with the input impedance Zo of the first transmission line 200.

Equation (4)

$$Rt2 = \frac{(Rs1 + Rin2) \times Rout2}{Rs1 + Rin2 + Rout2} \approx Zo \qquad (4)$$

The case of Zo>>Zo' will be described. Since this case corresponds to the case where Rout2 in the above equation (4) is large, the combined resistance value Rt2 and the condition for impedance matching are represented by the following equation (5). The resistance value Rs1 of the first series resistor 208 is adjusted to the value calculated based on the following equation (6) transformed from the equation (5). The resistance value Rout2 of the first terminator 201 is adjusted to Rout2=Zo in consideration of matching it with the first transmission line 100.

Equation (5)

$$Rt2 \approx Rs1 + Rin2 = Zo \qquad (5)$$

Equation (6)

$$Rs1 = Zo - Rin2 \qquad (6)$$

The first series resistor 208 is employed in addition to the first terminator 201 and the second terminator 203 as mentioned above, thus, the impedance over the entire transmission line is substantially set to the constant value Zo even in the case where the difference between the impedances of the first and second transmission lines 201 and 206 is large (Zo>>Zo'). Therefore, even in the case of Zo>>Zo', it is possible to suppress reflection of signals and noise generated due to the reflection.

The impedance graph of FIG. 2 shows the relationship between the distance from an input end 202 in the signal transmission direction, and the impedance. The solid line represents the impedance of the signal receiving circuit 2 including the first series resistor 208. As shown by the solid line, in the signal receiving circuit 2, even if the difference between the impedances of the first and second transmission lines 200 and 206 is large (Zo>>Zo'), the impedance of the entire transmission line is the constant value Zo.

The dashed line represents the impedance in the case where the first series resistor 208 is not provided. In the case where the first series resistor 208 is not inserted, the impedance Rt2 in the output side viewed from the first transmission line 200 becomes Rt2=Rin2. That is, the impedance decreases in the output side relative to a node 207 between the first transmission line 200 and the second transmission line 206. This is caused by that the impedance Zo of the first transmission line 200 is higher than the impedance Zo' of the second transmission line 206.

2-3. Effect

In this embodiment, when the impedance Zo of the first transmission line 200 is higher than the impedance Zo' of the second transmission line 206, the first series resistor 208 is employed in addition to the first and second terminators 201 and 203. Accordingly, even in the case of Zo>>Zo', the impedance in the output side viewed from the first transmission line 200 can be kept at the constant value Zo.

Third Embodiment

3-1. Construction

Figure 3:
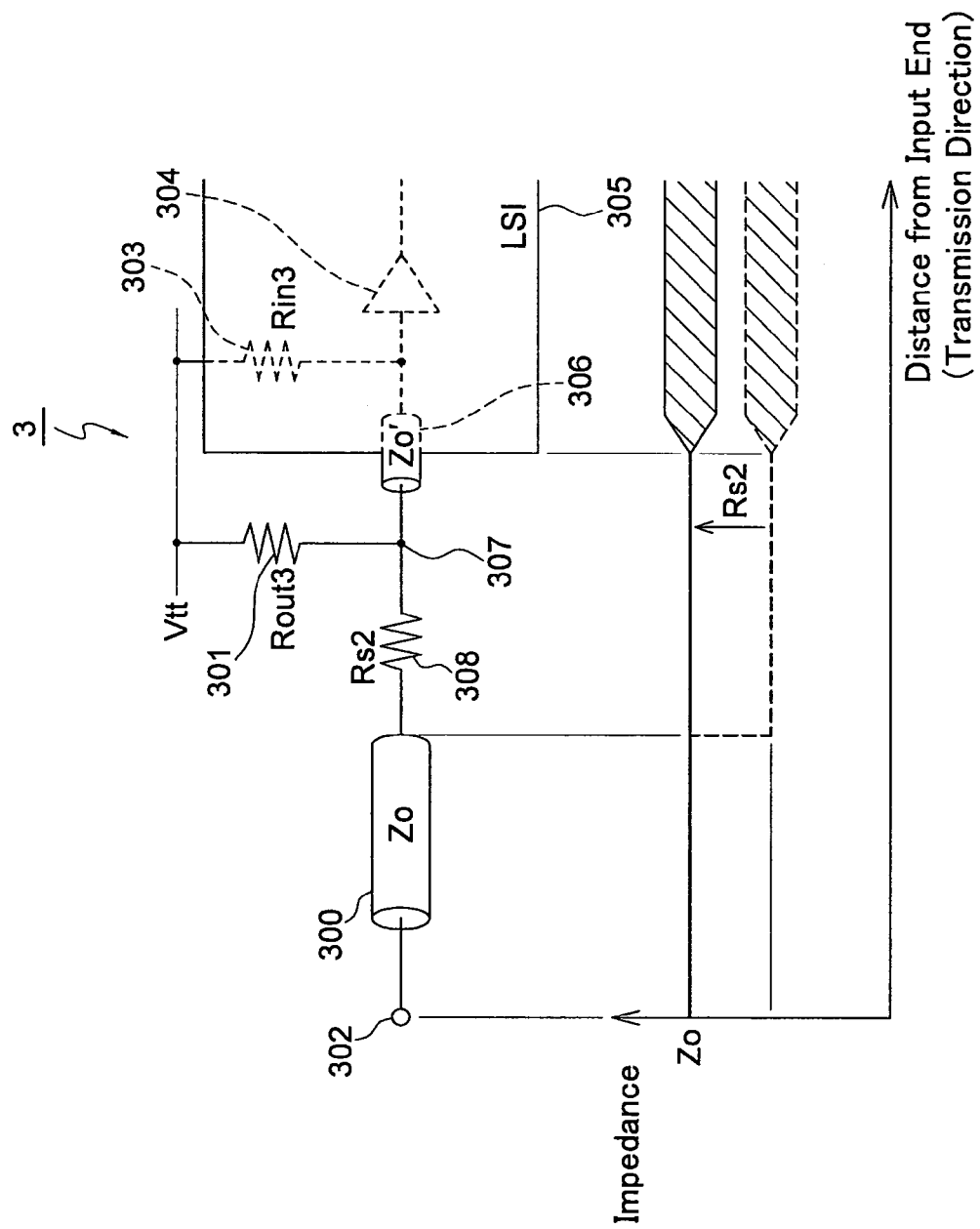
FIG. 3 shows a circuit diagram of a signal receiving circuit according to a third embodiment, and an impedance graph thereof.

FIG. 3 shows a schematic diagram of a signal receiving circuit according to a third embodiment of the present invention, and an impedance graph. In the cases where the impedance value Zo of a first transmission line 300 is higher than the impedance value Zo' of a second transmission line 306 (Zo>>Zo'), the signal receiving circuit 3 of this embodiment is preferable, similar to the second embodiment.

The signal receiving circuit 3 of FIG. 3 has a second series resistor 308 on the first transmission line 300. The second series resistor 308 is connected to the second transmission line 306 in series. The other construction of this signal receiving circuit 3 is similar to the first embodiment. That is, the first transmission line 300 and the second transmission line 306 are connected in series. A receiver 304 provided inside a semiconductor device 305 is connected to the second transmission line 306 in series. A first terminator 301 with resistance value Rout3 is connected to the first transmission line 300 in parallel, and is provided externally of the semiconductor device 305. A second terminator 303 with resistance value Rin3 is provided inside the semiconductor device 305, and is connected to the second transmission line 306 in parallel. One end of each of the first and second terminators 301 and 303 is connected to the power supply Vtt. The potential of the power supply Vtt is not specifically limited, and may be grounded.

3-2. Impedance Matching

How impedance matching is achieved in the signal receiving circuit 3 of FIG. 3 will now described. First, the cases where the second series resistor 308 is not provided will be described, then, the cases where it is provided will be described.

3-2-1. No Second Series Resistor Present

First, the cases where the second series resistor 308 is not provided in the signal receiving circuit 3 of FIG. 3 will be described. These cases correspond to the condition similar to the second embodiment (Zo>>Zo'). That is, these cases correspond to the cases where the impedance Zo of the first transmission line 100 is higher than the impedance Zo' of the second transmission line 106 (Zo>>Zo') in the aforementioned signal receiving circuit 1 of FIG. 1. Since these cases correspond to the cases where the Rout1 in the foregoing equation (1) is large, the combined resistance value Rt1 can be approximated by the following equation (7). That is, the impedance value Rt1 in the output side viewed from the first transmission line 100 is "Rin1". Since "Rin1" is adjusted so as to match with Zo', the impedance cannot be set to the constant value Zo over the entire transmission line in the output side. For this reason, in the case of Zo>>Zo', it is found that the first terminator 301 and the second terminator 303 cannot completely achieve impedance matching only by themselves.

Equation (7)

$$Rt1 \approx Rin1 = Zo' \qquad (7)$$

3-2-2. Second Series Resistor Present

On the other hand, in the signal receiving circuit 3 of FIG. 3, the resistance value Rt3 of the combined resistance in the case viewed from the first transmission line 300 matches with the input impedance value Zo of the first transmission line 300. The combined resistance value Rt3 is the combined resistance value of the first and second terminators 301 and 303, the second transmission line 306, and the second series resistor 308. That is, in the signal receiving circuit 3, the following three resistance values which affect the combined resistance value Rt3 are adjusted so as to achieve impedance matching.

(a) The resistance value Rout3 of the first terminator 301
(b) The resistance value Rin3 of the second terminator 303
(c) The resistance value Rs2 of the second series resistor 308

Specifically, first, the resistance value Rin3 of the second terminator 303 is adjusted so as to be equal to the impedance value Zo' of the second transmission line 306. Accordingly, it can be thought that the impedance of the second transmission line 306 is the constant value Zo'.

The resistance value Rout3 of the first terminator 301, and the resistance value Rs2 of the second series resistor 308 are adjusted based on the following equation (8). The following equation (8) shows the condition where the combined resistance value Rt3 in the output side viewed from the first transmission line 300 matches with the input impedance Zo of the first transmission line 300.

Equation (8)

$$Rt3 = \frac{Rout3 \times Rin3}{Rout3 + Rin3} + Rs2 \approx Zo \qquad (8)$$

The case of Zo>>Zo' will be described. As shown in the circuit diagram of FIG. 3, the circuit in the output side viewed from the first transmission line 300 and the second series resistor 308 is equal to the circuit of FIG. 1 in the output side viewed from the transmission line 100. That is, the first term part of the above equation (8), i.e., the part of the first transmission line 300 and the first terminator 301, can be represented similarly to the foregoing approximate equation (7) by using the condition of Zo>>Zo' (following equation (9)). Accordingly, the above equation (8) can be represented as the following equation (10) by using the following equation (9). The resistance value Rs2 of the second series resistor 308 is adjusted to the value calculated based on the following equation (11) transformed from the equation (10). The resistance value Rout3 of the first terminator 301 is adjusted to Rout3=Zo in consideration of matching it with the first transmission line 300.

Equation (9)

$$\frac{Rout3 \times Rin3}{Rout3 + Rin3} \approx Rin3 = Zo'. \qquad (9)$$

Equation (10)

$$Rt3 \approx Rin3 + Rs2 = Zo \qquad (10)$$

Equation (11)

$$Rs2 = Zo - Rin3 \qquad (11)$$

The second series resistor 308 is employed in addition to the first terminator 301 and the second terminator 303 as mentioned above, thus, the impedance over the entire transmission line can be substantially set to the constant value Zo even in the cases where the impedance value Zo of the first transmission line 300 is larger than the impedance value Zo' of the second transmission line 306 (Zo>>Zo'). Therefore, even in the case of Zo>>Zo', it is possible to suppress reflection of signals and noise generated due to the reflection.

The impedance graph of FIG. 3 shows the relationship between the distance from an input end 302 in the signal transmission direction, and the impedance. The solid line represents the impedance of the signal receiving circuit 3 including the second series resistor 308. As shown by the solid line, in the signal receiving circuit 3, even if the impedance value Zo of the first transmission line 300 is larger than the impedance value Zo' of the second transmission line 306 (Zo>>Zo'), the impedance of the entire transmission line is the constant value Zo.

The dashed line shows the impedance graph in the cases where the second series resistor 308 is not provided. In the cases where the second series resistor 308 is not inserted, the impedance in the output side viewed from the first transmission line 300 satisfies Rt3=Rin3=Zo'. That is, the impedance decreases in the output side relative to a node between the first transmission line 300 and the second transmission line 306. This is caused by the value of the impedance Zo of the first transmission line 300 being higher than the second transmission line Zo'.

3-3. Effect

In this embodiment, when the impedance Zo of the first transmission line 300 is higher than the impedance Zo' of the second transmission line 306 (Zo>>Zo'), the second series resistor 308 is employed in addition to the first and second terminators 301 and 303. Accordingly, even in the case of Zo>>Zo', the impedance in the output side viewed from the first transmission line 300 can be kept at the constant value Zo.

Fourth Embodiment

Figure 4:
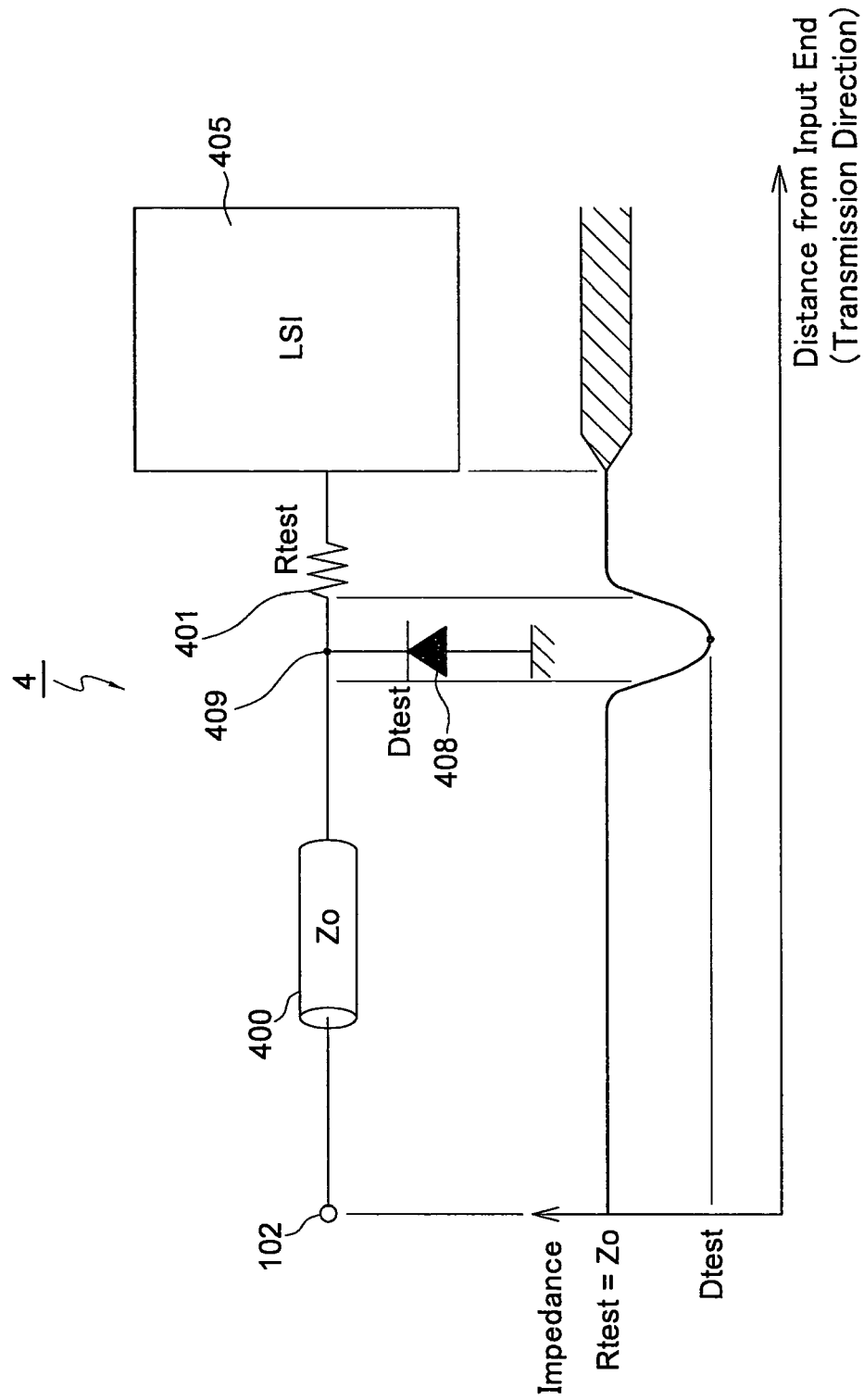
FIG. 4 shows the impedance characteristic of an electrostatic discharge protection component.

4-1. Influence on Impedance Due to Insertion of Electrostatic Discharge Protection Component FIG. 4 shows he influence on the impedance due to the signal receiving circuit 4 with an electrostatic discharge protection component inserted therein. In the signal receiving circuit 4 of FIG. 4, a first transmission line 400 and a terminator 401 are connected in parallel. The terminator 401 is connected to a semiconductor device 405 in series. The electrostatic discharge protection component 408 is connected to the first transmission line 400 in parallel between the first transmission line 400 and the terminator 401. In the signal receiving circuit 4, the impedance value Zo of the first transmission line 400 matches with the resistance value Rtest of the terminator 401.

Generally, since an electrostatic discharge protection component has a capacitive component, the electrostatic discharge protection component has a low impedance. According to this characteristic, the electrostatic discharge protection component is used to protect the semiconductor device from high voltage, high frequency noise due to static electricity or the like. However, as shown in the impedance graph of FIG. 4, the impedance of a part corresponding to the electrostatic discharge protection component locally reduces due to the capacitive component of the electrostatic discharge protection component. Accordingly, to further prevent the reflection phenomenon in transmission of signal, it is preferable to compensate for reduction of the impedance due to the electrostatic discharge protection component.

4-1. Construction

Figure 5:
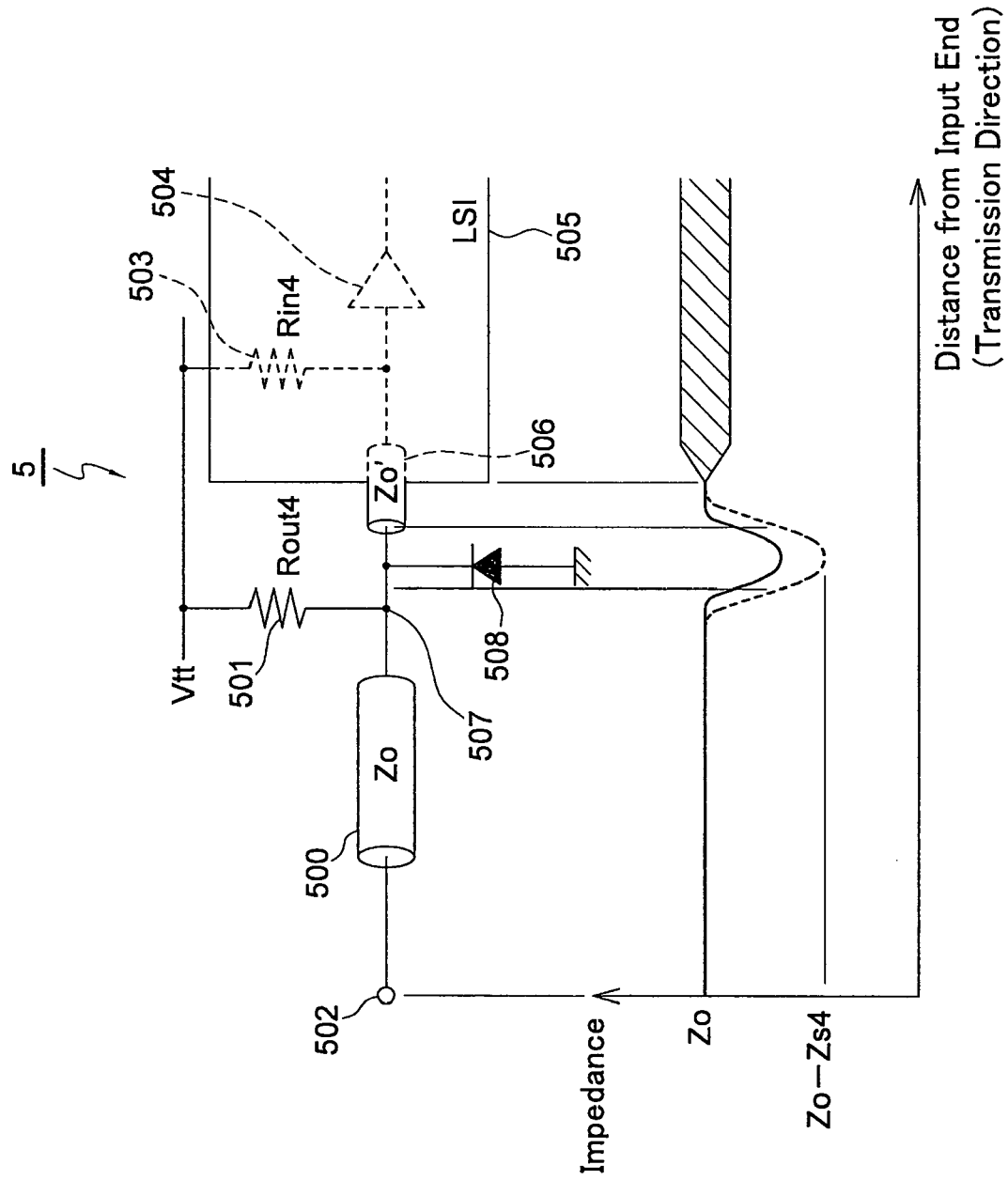
FIG. 5 shows a circuit diagram of a signal receiving circuit according to a fourth embodiment, and an impedance graph thereof.

FIG. 5 shows a schematic diagram of a signal receiving circuit according to a fourth embodiment of the present invention, and an impedance graph. In the signal receiving circuit 5 of this embodiment, when the impedance Zo' of a second transmission line 506 is higher than the impedance Zo of a first transmission line 500 (Zo>Zo'), a first electrostatic discharge protection component 508 is connected to the second transmission line 506 in parallel. The first electrostatic discharge protection component 508 is provided externally of a semiconductor device 505. The other construction of this signal receiving circuit 5 is similar to the first embodiment. That is, the first transmission line 500 and the second transmission line 506 are connected in series. A receiver 504 provided inside the semiconductor device 505 is connected to the second transmission line 506 in series. A first terminator 501 with resistance value Rout4 is connected to the first transmission line 500 in parallel, and is provided externally of the semiconductor device 505. A second terminator 503 with resistance value Rin4 is provided inside the semiconductor device 505, and is connected to the second transmission line 506 in parallel. One end of each of the first and second terminators 501 and 503 is connected to the power supply Vtt.

The potential of the power supply Vtt is not specifically limited, and may be grounded.

4-3. Impedance Matching

How impedance matching is achieved will now described in the signal receiving circuit 5 of FIG. 5. The impedance matching of the transmission line in the signal receiving circuit 5 of FIG. 5 is achieved similarly to the signal receiving circuit 1 of FIG. 1. That is, in the signal receiving circuit 5, the resistance value Rt4' of the combined resistance in the output side viewed from the first transmission line 500 matches with the input impedance Zo of the first transmission line 500. The combined resistance value Rt4' is the combined resistance value of the first and second terminators 501 and 503, and the second transmission line 506. That is, in the signal receiving circuit 5, the following two resistance values which affect the combined resistance value Rt4' are adjusted so as to achieve impedance matching in the entire transmission line.

(a) The resistance value Rout4 of the first terminator 501
(b) The resistance value Rin4 of the second terminator 503

Specifically, first, the resistance value Rin4 of the second terminator 503 is adjusted so as to be equal to the impedance value Zo' of the second transmission line 506. Accordingly, it can be thought that the impedance of the second transmission line 506 is the constant value Zo'.

The resistance value Rout4 of the first terminator 501 is adjusted to the value calculated based on the following equation (12). The following equation (12) shows the condition where the combined resistance value Rt4' in the output side viewed from the first transmission line 500 matches with the input impedance Zo of the first transmission line 500.

$$Rt4' = \frac{Rout4 \times Rin4}{Rout4 + Rin4} \approx Zo \tag{12}$$

The first terminator Rout4 is adjusted to the value calculated by the equation which transformed from the above equation (12).

When the resistance value Rout4 of the first terminator 501 is adjusted as mentioned above, the impedance in the transmission line is set substantially to the constant value Zo. In addition, it is possible to reduce local reduction of the impedance due to insertion of the first electrostatic discharge protection component 508 to the second transmission line 506.

In this embodiment, the first electrostatic discharge protection component 508 is connected to the second transmission line 506 with impedance Zo' higher than the impedance Zo of the first transmission line 500 (Zo'>Zo) in parallel. As already described in Section 4-1, since an electrostatic discharge protection component has a capacitive component, the impedance of the electrostatic discharge protection component locally reduces. Accordingly, the electrostatic discharge protection component is connected to the second transmission line 506 with high impedance in parallel. Thus, the local reduction of the impedance due to the electrostatic discharge protection component is raised by the impedance Zo' of the second transmission line 506. Therefore, the local reduction of the impedance of the electrostatic discharge protection component is reduced.

The impedance graph of FIG. 5 shows the relationship between the distance from an input end 502 in the signal transmission direction, and the impedance. The solid line represents the impedance of the signal receiving circuit 5 in which the impedance matching of the transmission line is achieved by using the first terminator 501 and the second terminator 503, and the first electrostatic discharge protection component 508 is connected to the second transmission line 506 in parallel. The dashed line represents the impedance graph of the cases where an electrostatic discharge protection component is inserted without using two resistors, the first and second terminators 501 and 503. As shown by the solid line of the impedance graph in FIG. 5, when the respective resistance values Rout4 and Rin4 of the first and second terminators 501 and 503 are adjusted, the impedance in the transmission line is substantially constant. Therefore, the local reduction of the impedance due to insertion of the electrostatic discharge protection component is reduced.

4-4. Effect

In this embodiment, the first terminator 501 and the second terminator 503 are connected to the first transmission line 500 and the second transmission line 506 in parallel, respectively. Additionally, when the impedance Zo' of the second transmission line 506 is higher than the impedance Zo of the first transmission line 500 (Zo'>Zo), the first electrostatic discharge protection component 508 is connected to the second transmission line 506 in parallel. Accordingly, even when the electrostatic discharge protection component is inserted, the impedance of the transmission line is kept constant, and it is possible to reduce local reduction of the impedance due to insertion of electrostatic discharge protection component. Therefore, it is possible to reduce distortion of the waveform of a signal from which high frequency noise is eliminated by the electrostatic discharge protection component, and to transmit the signal.

Fifth Embodiment 5-1. Construction

Figure 6:
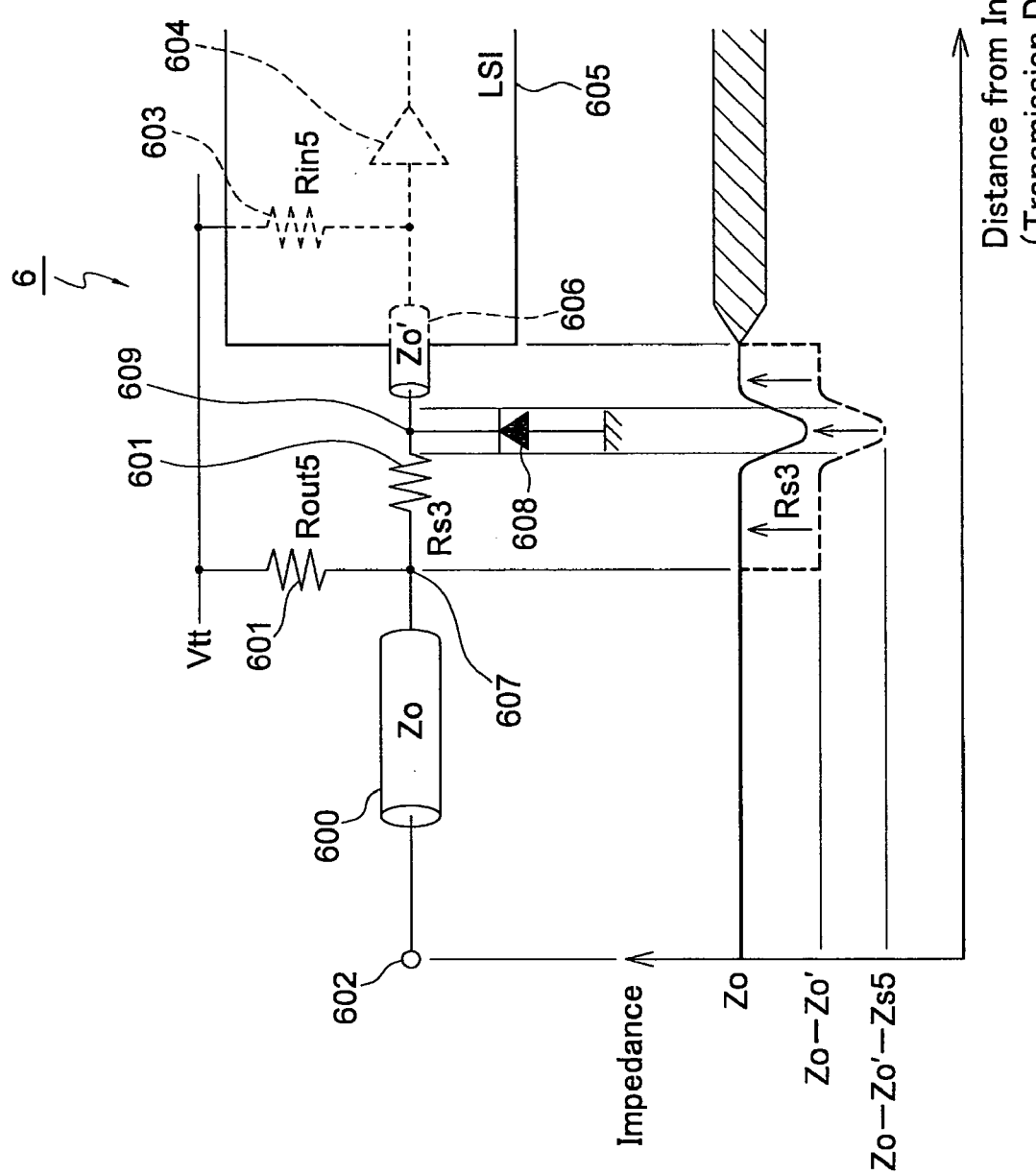
FIG. 6 shows a circuit diagram of a signal receiving circuit according to a fifth embodiment, and an impedance graph thereof.

FIG. 6 shows a schematic diagram of a signal receiving circuit according to a fifth embodiment of the present invention, and an impedance graph. In the cases where the impedance value Zo of a first transmission line 600 is higher than the impedance value Zo' of a second transmission line 606 (Zo>>Zo'), and an electrostatic discharge protection component is inserted, the signal receiving circuit 6 of this embodiment is preferable. In the signal receiving circuit 6 of this embodiment, a first electrostatic discharge protection component 608 is connected to the second transmission line 606 in parallel. The first electrostatic discharge protection component 608 is provided externally of a semiconductor device 605. The other construction of this signal receiving circuit 6 is similar to the second embodiment. That is, the first transmission line 600 and the second transmission line 606 are connected in series. A receiver 604 provided inside the semiconductor device 605 is connected to the second transmission line 606 in series. A first terminator 601 with resistance value Rout5 is connected to the first transmission line 600 in parallel, and is provided externally of the semiconductor device 605. A second terminator 603 with resistance value Rin5 is provided inside the semiconductor device 605, and is connected to the second transmission line 606 in parallel. One end of each of the first and second terminators 601 and 603 is connected to the power supply Vtt. A first series resistor 610 is on the second transmission line 606, and is connected in series to and provided externally of the semiconductor device 605.

The potential of the power supply Vtt is not specifically limited, and may be grounded.

5-2. Impedance Matching

How impedance matching is achieved will now described in the signal receiving circuit 6 of FIG. 6. First, the problem in the cases where the first series resistor 610 is not provided will be described, then, the cases where it is provided will be described.

5-2-1. First Series Resistor Present

First, the cases where the first series resistor 610 is not provided in the signal receiving circuit 6 of FIG. 6 will be described. These cases correspond to the cases where the impedance Zo of the first transmission line 500 is higher than the impedance Zo' of the second transmission line 506 (Zo>>Zo') in the aforementioned signal receiving circuit 5 of FIG. 5. Since these cases correspond to the cases where Rout4 in the foregoing equation (12) is large, the combined resistance value Rt4' can be approximated by the following equation (13). The resistance value Rin4 of the second terminator 503 is adjusted to the impedance value Zo' of the second transmission line 506 (Rin4=Zo'). That is, the value of the impedance Rt4' in the output side viewed from the first transmission line 500 is "Rin4". Accordingly, the impedance cannot be set to the constant value Zo over the entire transmission line. For this reason, in the case of Zo>>Zo', it is found that the first terminator 601 and the second terminator 603 cannot completely achieve impedance matching only by themselves.

Equation (13)

$$Rt4' \approx Rin4 \qquad (13)$$

5-2-2. First Series Resistor Present

On the other hand, in the signal receiving circuit 6, the resistance value Rt4" of the combined resistance in the output side viewed from the first transmission line 600 matches with the input impedance Zo of the first transmission line 600 (Rt4"≈Zo). The combined resistance value Rt4" is the combined resistance value of the first and second terminators 601 and 603, the second transmission line 606, and the first series resistor 610. That is, in the signal receiving circuit 6, the following three resistance values which affect the combined resistance value Rt4" are adjusted so as to achieve impedance matching in the entire transmission line.

(a) The resistance value Rout5 of the first terminator 601
(b) The resistance value Rin5 of the second terminator 603
(c) The resistance value Rs3 of the first series resistor 610

Specifically, first, the resistance value Rin5 of the second terminator 603 is adjusted so as to be equal to the impedance value Zo' of the second transmission line 606. Accordingly, it can be thought that the impedance of the second transmission line 606 is the constant value Zo'.

The resistance value Rs3 of the first series resistor 610 is adjusted based on the following equation (14). The following equation (14) shows the condition where the combined resistance value Rt4" in the output side viewed from the first transmission line 600 matches with the input impedance Zo of the first transmission line 600.

Equation (14)

$$Rt4'' = \frac{(Rs3 + Rin5) \times Rout5}{Rs3 + Rin5 + Rout5} \approx Zo \qquad (14)$$

The case of Zo>>Zo' will be described. Since these cases correspond to the cases where Rout5 in the above equation (14) is large, the combined resistance value Rt4" and the condition for impedance matching are represented by the following equation (15). The resistance value Rs3 of the first series resistor 610 is adjusted to the value calculated based on the equation transformed from the following equation (15). The resistance value Rout5 of the first terminator 601 is adjusted to Rout5=Zo in consideration of matching it with the first transmission line 600.

Equation (15)

$$Rt4'' \approx Rs3 + Rin4 = Zo \qquad (15)$$

The resistance value Rs3 of the first series resistor 610, the resistance value Rout5 of the first terminator 601, and the resistance value Rin5 of the second terminator are adjusted as mentioned above. Thus, even when the impedance Zo of the first transmission line 600 is higher than the impedance Zo' of the second transmission line (Zo>>Zo'), the impedance of the transmission line is set substantially to the constant value Zo. In addition, it is possible to reduce local reduction of the impedance due to connection of the first electrostatic discharge protection component 608 to the second transmission line 606.

In this embodiment, the first electrostatic discharge protection component 608 is connected to the first series resistor 610 and the second transmission line 606 in parallel. The impedance Zo' of the second transmission line 606 is equal to the value Rin4 of the second terminator. Accordingly, the combined resistance value of the first series resistor 610 and the second transmission line 606 is substantially equal to the impedance Zo of the first transmission line 600, as shown in the above equation (15). Additionally, in this embodiment, the impedance Zo of the first transmission line is higher than the impedance Zo' of the second transmission line 606 (Zo>Zo'). In consideration of the above discussion, the first electrostatic discharge protection component 608 is inserted in parallel into a part which has a high impedance equal to the high impedance Zo of the first transmission line 600. As already described in Section 4-1, since an electrostatic discharge protection component has a capacitive component, the impedance of the electrostatic discharge protection component locally reduces. Accordingly, the electrostatic discharge protection component is connected a part near the first series resistor 610 and the second transmission line 606, which have a high impedance when they are combined, in parallel. Thus, the local reduction of the impedance due to the electrostatic discharge protection component is raised by the combined impedance Zo' of the first series resistor 610 and the second transmission line 606 (Rs3+Zo'=Zo). Therefore, the reduction of the electrostatic discharge protection component is reduced.

The impedance graph of FIG. 6 shows the relationship between the distance from an input end 602 in the signal transmission direction, and the impedance. In the case of Zo>>Zo', the solid line represents the impedance of the signal receiving circuit 6 in which the impedance matching of the transmission line is achieved by using the first and second terminator 601 and 603, and the first series resistor 610, and the first electrostatic discharge protection component 608 is connected to the second transmission line 606 in parallel. As shown by the solid line, in the signal receiving circuit 6, even if the difference between the impedances of the first and second transmission lines 600 and 602 is large (Zo>>Zo'), the impedance of the entire transmission line is substantially the constant value. Therefore, the local reduction of the impedance due to insertion of the electrostatic discharge protection component is reduced.

The dashed line represents the impedance graph in the case of Zo>>Zo', and the cases where the first series resistor 610 is not employed. In the cases where the first series resistor 610 is not inserted, the impedance in the output side viewed from the first transmission line 600 reduces. Particularly, local reduction is observed in a part where the electrostatic discharge protection component is inserted.

5-3. Effect

This embodiment corresponds to the cases where the impedance value Zo of the first transmission line 600 is higher than the impedance value Zo' of the second transmission line 606 (Zo>>Zo'), and the cases where the first electrostatic discharge protection component is connected to the second transmission line 506 in parallel. In this embodiment, the first terminator 601 and the second terminator 603 are connected to the first transmission line 600 and the second transmission line 606 in parallel, respectively, and the first series resistor 610 is connected on the second transmission line 606 in series to and provided externally of the semiconductor device 605. Accordingly, even in the case of Zo>>Zo', and in the cases where the electrostatic discharge protection component is inserted, the impedance of the transmission line is substantially kept constant, and it is possible to reduce local reduction of the impedance due to insertion of electrostatic discharge protection component. Therefore, it is possible to reduce distortion of the waveform of a signal from which high frequency noise is eliminated by the electrostatic discharge protection component, and to transmit the signal.

Sixth Embodiment

61. Construction

Figure 7:
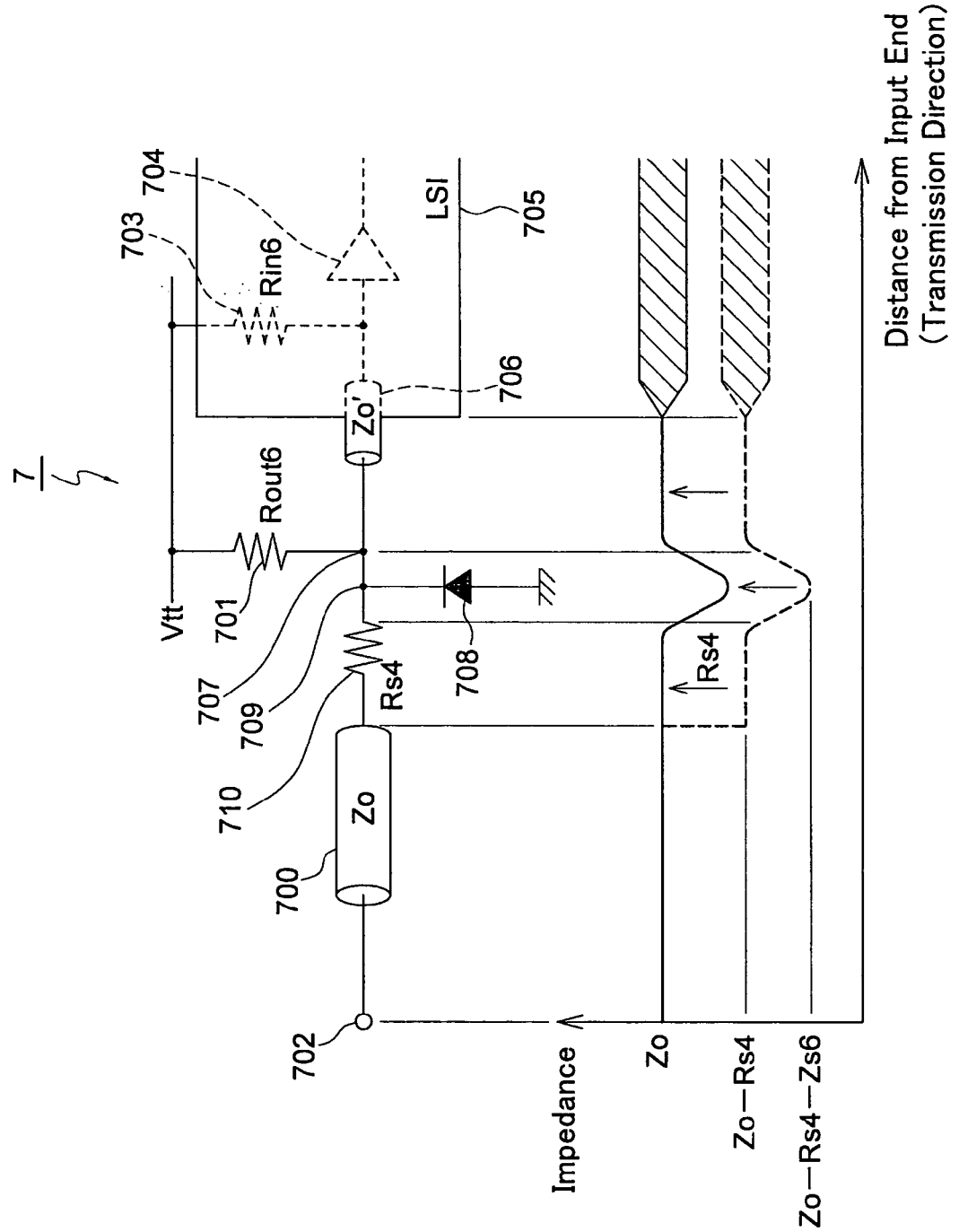
FIG. 7 shows a circuit diagram of a signal receiving circuit according to a sixth embodiment, and an impedance graph thereof.

FIG. 7 shows a schematic diagram of a signal receiving circuit according to a sixth embodiment of the present invention, and an impedance graph. In the cases where the impedance value Zo of a first transmission line 700 is higher than the impedance Zo' of a second transmission line 706 (Zo>>Zo'), and an electrostatic discharge protection component is inserted, the signal receiving circuit 7 of this embodiment is preferable, similarly to the fifth embodiment.

In the signal receiving circuit 7 of this embodiment, a second electrostatic discharge protection component 708 is connected to the first transmission line 700 in parallel. The second electrostatic discharge protection component 708 is provided externally of a semiconductor device 705. The other construction of this signal receiving circuit 7 is similar to the third embodiment. That is, the first transmission line 700 and the second transmission line 706 are connected in series. A receiver 704 provided inside a semiconductor device 705 is connected to the second transmission line 706 in series. A first terminator 701 with resistance value Rout6 is connected to the first transmission line 700 in parallel, and is provided externally of the semiconductor device 705. A second terminator 703 with resistance value Rin6 is provided inside the semiconductor device 705, and is connected to the second transmission line 706 in parallel. One end of each of the first and second terminators 701 and 703 is connected to the power supply Vtt. A second series resistor 710 is on the first transmission line 700, and is connected to the second transmission line 706 in series. The potential of the power supply Vtt is not specifically limited, and may be grounded.

6-2. Impedance Matching

How impedance matching is achieved will now described in the signal receiving circuit 7 of FIG. 7. First, the cases where the second series resistor 710 is not provided will be described, then, the cases where it is provided will be described.

6-2-1. No Second Series Resistor Present

First, the cases where the second series resistor 710 is not provided in the signal receiving circuit 7 of FIG. 7 will be described. These cases correspond to the condition similar to the fifth embodiment (Zo>>Zo'). That is, these cases correspond to the case where the impedance Zo of the first transmission line 500 is higher than the impedance Zo' of the second transmission line 506 (Zo>>Zo') in the aforementioned signal receiving circuit 5 of FIG. 5. Since these cases correspond to the cases where Rout4 in the foregoing equation (12) is large, the combined resistance value Rt4' can be approximated by the following equation (16). The resistance value Rin4 of the second terminator 503 is adjusted to the impedance value Zo' of the second transmission line 506 (Rin4=Zo'). That is, the value of the impedance Rt4' in the output side viewed from the first transmission line 500 is "Rin4". Accordingly, the impedance cannot be set to the constant value Zo over the entire transmission line. For this reason, in the case of Zo>>Zo', it is found that the first terminator 701 and the second terminator 703 cannot completely achieve impedance matching only by themselves.

Equation (16)

$$Rt4' \approx Rin4 = Zo' \qquad (16)$$

6-2-2. Second Series Resistor Present

On the other hand, in the signal receiving circuit 7, the resistance value Rt6 of the combined resistance in the output side viewed from the first transmission line 700 matches with the input impedance Zo of the first transmission line 700 (Rt6≈Zo). The combined resistance value Rt6 is a combined resistance value of the first and second terminators 701 and 703, the second transmission line 706, and the second series resistor 710. That is, in the signal receiving circuit 7, the following three resistance values which affect the combined resistance value Rt6 are adjusted so as to achieve impedance matching in the entire transmission line.
(a) The resistance value Rout6 of the first terminator 701
(b) The resistance value Rin6 of the second terminator 703
(c) The resistance value Rs4 of the second series resistor 710

Specifically, first, the resistance value Rin6 of the second terminator 703 is adjusted so as to be equal to the impedance value Zo' of the second transmission line 706. Accordingly, it can be thought that the impedance of the second transmission line 706 is the constant value Zo'.

The resistance value Rs4 of the first series resistor 710 is adjusted based on the following equation (17). The following equation (17) shows the condition where the combined resistance value Rt6 in the output side viewed from the first transmission line 700 matches with the input impedance Zo of the first transmission line 700.

Equation (17)

$$Rt6 = \left(\frac{Rout6 \times Rin6}{Rout6 + Rin6}\right) + Rs4 \approx Zo \qquad (17)$$

The case of Zo>>Zo' will be described. As shown in the circuit diagram of FIG. 7, the circuit in the output side viewed from the first transmission line 700 and the second series resistor 710 is equal to the circuit of FIG. 5 in the output side viewed from the transmission line 500. That is, the first term of the above equation (17), i.e., the part of the first terminator 701 and the second terminator 703, can be represented similarly to the foregoing approximate equation (16) by using the condition of Zo>>Zo' (following equation (18)). Accordingly, the above equation (17) can be represented as the following equation (19) by using the following equation (18). The resistance value Rs4 of the second series resistor 708 is adjusted to the value calculated based on the equation transformed from the following equation (19). The resistance value Rout6 of the first terminator 701 is adjusted to Rout6=Zo in consideration of matching it with the first transmission line 700.

Equation (18)

$$\left(\frac{Rout6 \times Rin6}{Rout6 + Rin6}\right) \approx Rin4 = Zo' \qquad (18)$$

Equation (19)

$$Rt6 = Rin4 + Rs4 = Zo \qquad (19)$$

The resistance value Rs4 of the second series resistor 710, the resistance value Rout6 of the first terminator 701, and the resistance value Rin6 of the second terminator 703 are adjusted as mentioned above. Thus, even when the impedance Zo of the first transmission line 700 is higher than the impedance Zo' of the second transmission line 706 (Zo>>Zo'), the impedance of the transmission line is set substantially to the constant value Zo. In addition, it is possible to reduce local reduction of the impedance due to connection of the second electrostatic discharge protection component to the first transmission line 700.

In this embodiment, the second electrostatic discharge protection component 708 is connected to the first transmission line 700 with impedance Zo higher than the impedance Zo' of the second transmission line 706 (Zo>>Zo') in parallel. As already described in Section 4-1, since an electrostatic discharge protection component has a capacitive component, the impedance of the electrostatic discharge protection component locally reduces. Accordingly, the electrostatic discharge protection component is connected to the first transmission line 700 with high impedance in parallel. Thus, the local reduction of the impedance due to the electrostatic discharge protection component is raised by the impedance Zo of the first transmission line 700. Therefore, the local reduction of the impedance of the electrostatic discharge protection component is reduced.

The impedance graph of FIG. 7 shows the relationship between the distance from an input end 702 in the signal transmission direction, and the impedance. In the case of Zo>>Zo', the solid line represents the impedance of the signal receiving circuit 7 in which the approximate impedance matching of the transmission line is achieved by using the first and second terminator 701 and 703, and the second series resistor 710, and the second electrostatic discharge protection component 708 is connected to the first transmission line 700 in parallel. As shown by the solid line, in the signal receiving circuit 7, even if the impedance Zo of the first transmission line 700 is larger than the impedance Zo' of the second transmission line 706 (Zo>>Zo'), the impedance of the entire transmission line is substantially a constant value. Therefore, the local reduction of the impedance due to insertion of the electrostatic discharge protection component is reduced.

The dashed line represents the impedance graph in the case of Zo>>Zo', and the cases where the second series resistor 710 is not employed. In the cases where the second series resistor 710 is not inserted, the impedance in the output side viewed from the first transmission line 700 reduces. Particularly, local reduction is observed in a part where the electrostatic discharge protection component is inserted.

6-3. Effect

This embodiment corresponds to the cases where the impedance value Zo of the first transmission line 700 is higher than the impedance Zo' of the second transmission line 706 (Zo>>Zo'), and the cases where the second electrostatic discharge protection component 708 is connected to the first transmission line 706 in parallel. In this embodiment, the first terminator 701 and the second terminator 703 are connected to the first transmission line 700 and the second transmission line 706 in parallel, respectively, and the second series resistor 710 is connected to the first transmission line 700 in series. Accordingly, even in the case of Zo>>Zo', and in the cases where the electrostatic discharge protection component is inserted, the impedance of the transmission line is substantially kept constant, and it is possible to reduce local reduction of the impedance due to insertion of electrostatic discharge protection component. Therefore, it is possible to reduce distortion of the waveform of a signal from which high frequency noise is eliminated by the electrostatic discharge protection component, and to transmit the signal.

However, in the fourth to sixth embodiments of the present invention, the arrangement of electrostatic discharge protection component is not limited to FIGS. 5 to 7. The electrostatic discharge protection component may be arranged anywhere near an element with high impedance in the transmission line. In addition, the electrostatic discharge protection component may be provided inside the semiconductor device.

Seventh Embodiment

7-1. Construction

Figure 8:
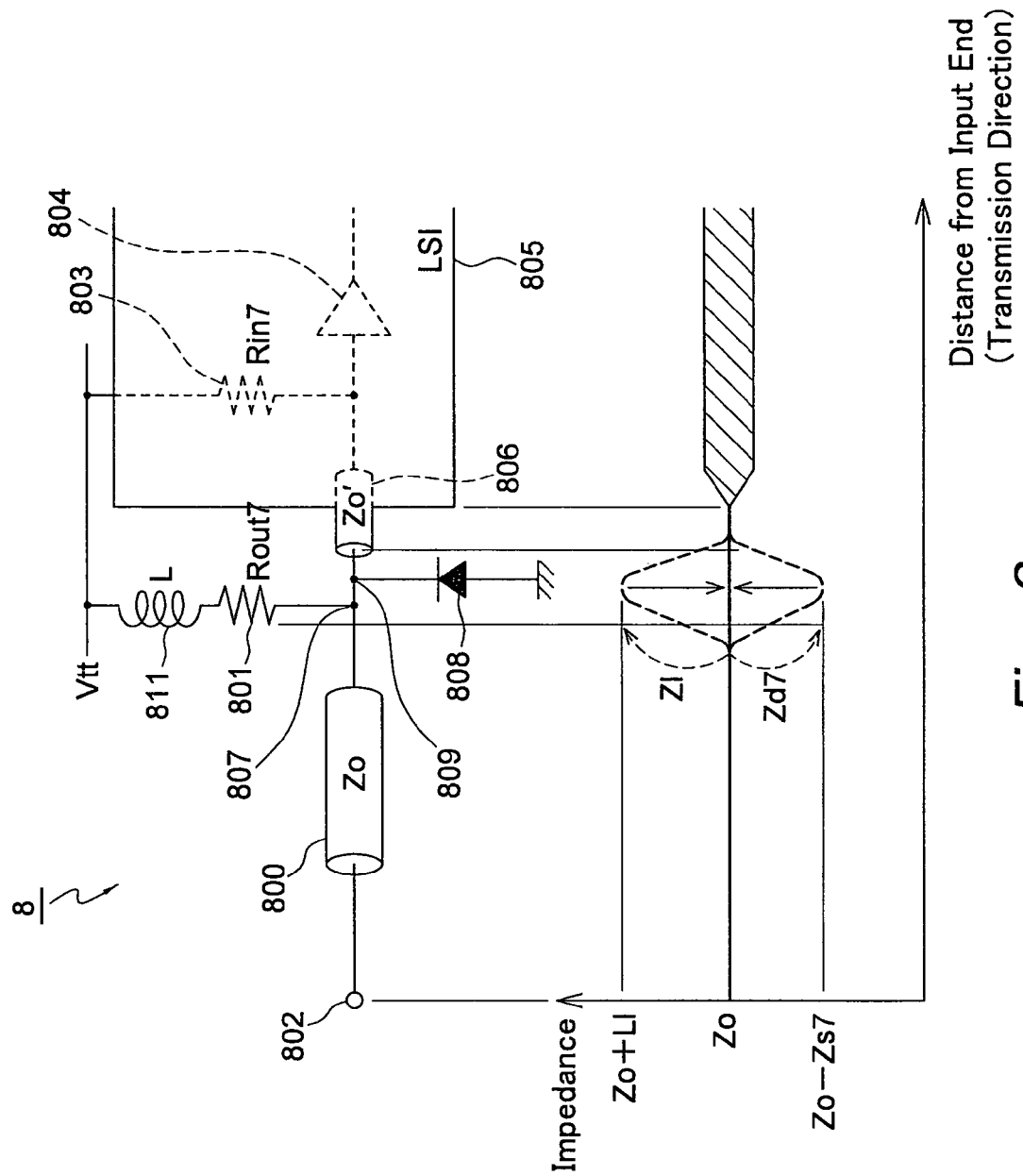
FIG. 8 shows a circuit diagram of a signal receiving circuit according to a seventh embodiment, and an impedance graph thereof.

FIG. 8 shows a schematic diagram of a signal receiving circuit according to a seventh embodiment of the present invention, and an impedance graph. The signal receiving circuit 8 of this embodiment is effective for the cases where an electrostatic discharge protection component, which can remove higher voltage, higher frequency noise than the electrostatic discharge protection components employed in the fourth to sixth embodiments, is connected.

In the signal receiving circuit 8 of FIG. 8, a coil 811 is connected to a first terminator 801 in series. The other construction of this signal receiving circuit 8 is similar to the fourth embodiment. That is, the first transmission line 800 and the second transmission line 806 are connected in series. A receiver 804 provided inside a semiconductor device 805 is connected to the second transmission line 806 in series. The first terminator 801 with resistance value Rout7 is connected to the first transmission line 800 in parallel, and is provided externally of the semiconductor device 805. A second terminator 803 with resistance value Rin7 is provided inside the semiconductor device 805, and is connected to the second transmission line 806 in parallel. One end of each of the first and second terminators 801 and 803 is connected to the power supply Vtt. The electrostatic discharge protection component is connected to the second transmission line 806 in parallel on the second transmission line 806, and is provided externally of the semiconductor device 805. The potential of the power supply Vtt is not specifically limited, and may be grounded.

7-2. Impedance Matching

How impedance matching is achieved will now described in the signal receiving circuit 8 of FIG. 8. In the signal receiving circuit 8, the resistance value Rt5 of the combined resistance in the output side viewed from the first transmission line 800 matches with the input impedance Zo of the first transmission line 800. The combined resistance value Rt5 is the combined resistance value of the first and second terminators 801 and 803, and the second transmission line 806. That is, in the signal receiving circuit 8, the following two resistance values which affect the combined resistance value Rt5 are adjusted so as to achieve impedance matching in the transmission line.

(a) The resistance value Rout7 of the first terminator 801
(b) The resistance value Rin7 of the second terminator 803

Specifically, first, the resistance value Rin7 of the second terminator 806 is adjusted so as to be equal to the impedance value Zo' of the second transmission line 803. Accordingly, it can be thought that the impedance of the second transmission line 806 is the constant value Zo'.

The resistance value Rout7 of the first terminator 801 is adjusted to the value calculated based on the following equation (20). The following equation (20) shows the condition where the combined resistance value Rt5 in the output side viewed from the first transmission line 800 matches with the input impedance Zo of the first transmission line 800.

Equation (20)

$$Rt5 = \frac{Rout7 \times Rin7}{Rout7 + Rin7} \approx Zo \qquad (20)$$

The above equation (20) is transformed, thus, an equation representing the resistance value Rout7 of the first terminator 801 can be obtained.

The impedances of the electrostatic discharge protection component and the coil will be described. Generally, since an electrostatic discharge protection component has a capacitive component, its impedance is low. As the electrostatic discharge protection component has a smaller capacitive component, the rate of reduction of its impedance will also be smaller. When a electrostatic discharge protection component with small capacitive component is employed, similarly to the fourth to six embodiments, the impedance of the electrostatic discharge protection component can be reduced by inserting the electrostatic discharge protection component near a transmission line with high impedance amongst the transmission lines matched by the first and second terminators. The amount of the capacitive component of the electrostatic discharge protection component depends on the magnitude of voltage and the number of frequency of noise to be removed. An electrostatic discharge protection component with large capacitive component can remove higher voltage, higher frequency noise than an electrostatic discharge protection component with small capacitive component. However, when an electrostatic discharge protection component with large capacitive component is used to remove higher voltage, higher frequency noise, the rate of reduction of impedance of the electrostatic discharge protection component is also larger. In this case, it is difficult to reduce the impedance of an electrostatic discharge protection component only by inserting the electrostatic discharge protection component near a transmission line with high impedance amongst the transmission lines matched by the first and second terminators.

Generally, a coil has high impedance characteristics. Particularly, as the frequency of a signal is higher, the impedance value of a coil is larger. A coil and an electrostatic discharge protection component are connected to the circuit in parallel to use these characteristics. Thus, high impedance of a coil and low impedance of a electrostatic discharge protection component can be canceled. Accordingly, in the cases where the capacitive component of electrostatic discharge protection component is large, and the impedance remarkably reduces, it is desirable that a coil with the impedance which can cancel the impedance of the electrostatic discharge protection component is inserted into near the electrostatic discharge protection component. Therefore, it is possible to achieve impedance matching of the electrostatic discharge protection component.

When the first terminator 801 and the second terminator 803 are adjusted as mentioned above, the impedance in the transmission line can be substantially set to the constant value Zo. In addition, the impedance due to the insertion of a electrostatic discharge protection component can be matched by inserting the coil 811.

The impedance graph of FIG. 8 shows the relationship between the distance from an input end 802 in the signal transmission direction, and the impedance. The solid line represents the impedance of the signal receiving circuit 8 in which the impedances of the transmission line and the electrostatic discharge protection component are approximately matched by using the first and second terminators 801 and 803, and the coil 811. The dashed line shows the impedance characteristic of each of the coil and the electrostatic discharge protection component when used alone. As shown in the impedance graph of FIG. 8, when the resistance value Rout7 of the first terminator 801 and the resistance value Rin7 of the second terminator 803 are adjusted, and the coil is inserted into a part near the electrostatic discharge protection component, the impedance in the entire transmission line can be kept substantially constant.

7-3. Effect

In this embodiment, when the electrostatic discharge protection component 808, which reduces the impedance more than the electrostatic discharge protection components used in the fourth to sixth embodiments, is connected to the second transmission line in parallel, the coil 811 is connected to the first terminator 801 in series. The impedance of the electrostatic discharge protection component 808 is canceled by the impedance of the coil 811. In addition, since the respective resistance values Rout and Rin of the first and second terminators 801 and 803 are adjusted, the impedance matching of the entire transmission line can be achieved, and reflection of signals in the entire transmission line can be prevented.

However, in the seventh embodiment, the coil is added to the circuit of FIG. 4 of the fourth embodiment, the coil may be similarly added to the circuit of FIG. 6 of the fifth embodiment, or FIG. 7 of the sixth embodiment.

Eighth Embodiment 8-1. Construction

The present invention is also applicable to a differential signal receiving circuit.

Figure 9:
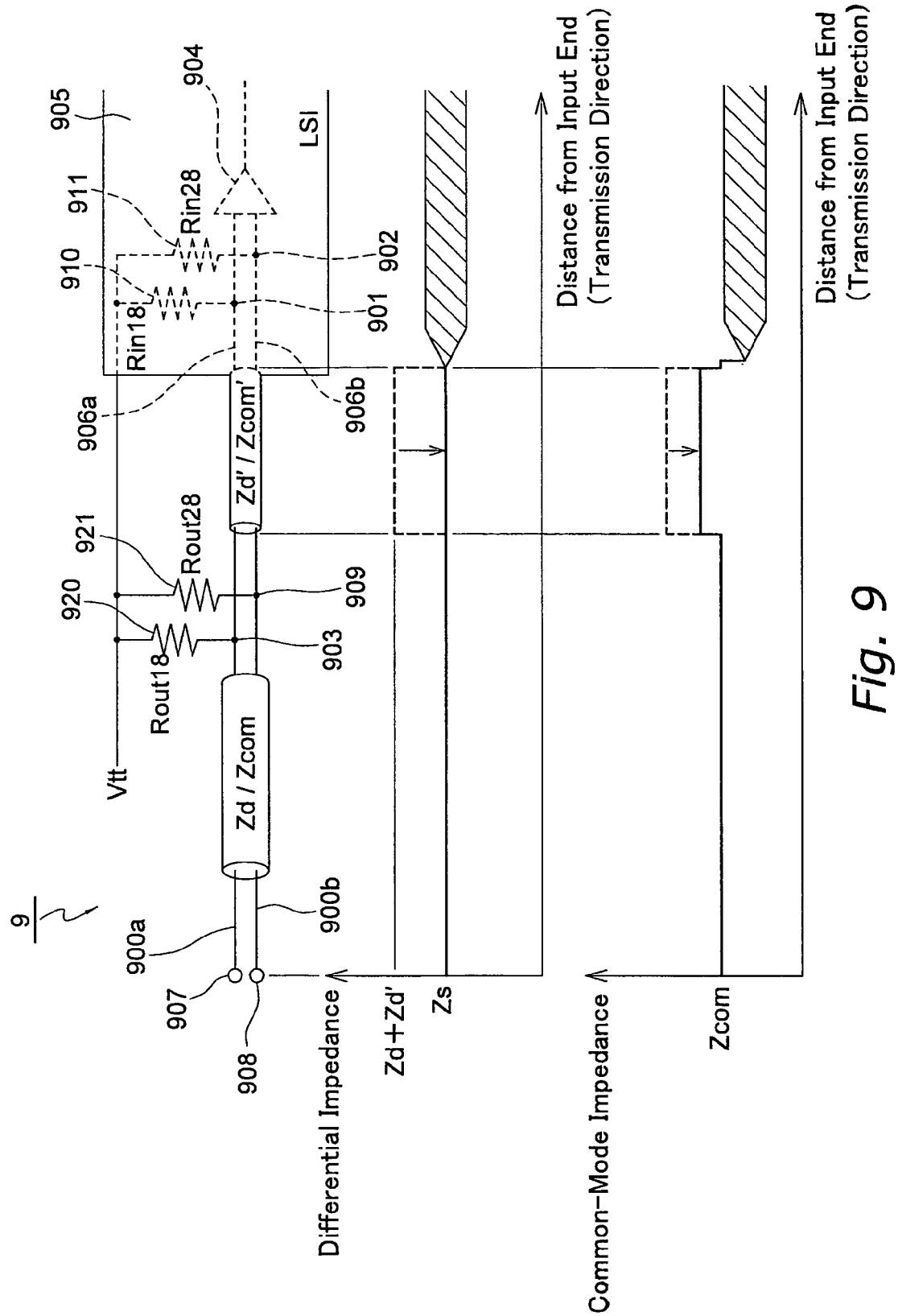
FIG. 9 shows a circuit diagram of a signal receiving circuit according to an eighth embodiment, and an impedance graph thereof.

FIG. 9 shows a schematic diagram of a signal receiving circuit according to an eighth embodiment of the present invention, and an impedance graph. The signal receiving circuit of FIG. 9 includes first to fourth transmission lines 900a, 900b, 906a and 906b, first to fourth terminators 920, 910, 921 and 911, and a semiconductor device 905. The first transmission line 900a and third transmission line 900b are wires on a printed circuit board (not shown), and has input ends 907 and 908 for signals, respectively. The second transmission line 906a and fourth transmission line 906b include input/output leads, electrode wires, and so on of the semiconductor device 905. The first transmission line 900a and second transmission line 906a are connected in series. The third transmission line 900b and fourth transmission line 906b are connected in series. The semiconductor device 905 includes a differential signal receiving circuit 904 for receiving two types of signals with phases inverted relative to each other. One input terminal of the differential signal receiving circuit 904 is connected to the second transmission line 906a. Another input terminal is connected to the fourth transmission line 906b. A first terminator 920 with value Rout18 is connected to the first transmission line 900a in parallel, and is provided externally of the semiconductor device 905. A second terminator 910 with value Rin18 is connected to the second transmission line 906a in parallel, and is provided inside the semiconductor device 905. A third terminator 921 with value Rout28 is connected to the third transmission line 900b in parallel, and is provided externally of the semiconductor device 905. A fourth terminator 911 with value Rin28 is connected to the fourth transmission line 906b in parallel, and is provided inside the semiconductor device 905. One end of each of the first to fourth terminators 920, 910, 921 and 911 is connected to the power supply Vtt.

Since the distance between the first and third transmission lines 900a and 900b is very small, it can be thought that the combined impedance of the first and third transmission lines 900a and 900b is Zo. Since the distance between the second and fourth transmission lines 906a and 906b is very small, it can be thought that the combined impedance of the second and fourth transmission lines 906a and 906b is Zo'.

The potential of the power supply Vtt is not specifically limited, and may be grounded.

8-2. Impedance Matching

How impedance matching is achieved will now described in the signal receiving circuit 9 of FIG. 9.

In the signal receiving circuit 9, the resistance value Rt8 of the combined resistance in the output side viewed from the first and third transmission lines 900a and 900b matches with the combined input impedance Zo of the first and third transmission lines 900a and 900b (Rt8≈Zo). The combined resistance value Rt8 is the combined resistance value of the first, second, third and fourth terminators 920, 910, 921 and 911, the second and fourth transmission lines 906a and 906b. That is, in the signal receiving circuit 9, the following four resistance values which affect the combined resistance value Rt8 are adjusted so as to achieve impedance matching in the entire transmission line.

(a) The resistance value Rout18 of the first terminator 920
(b) The resistance value Rin18 of the second terminator 910
(c) The resistance value Rout28 of the third terminator 921
(d) The resistance value Rin28 of the fourth terminator 911

Specifically, first, the resistance values Rin18 and Rin28 of the second terminator 910 and the fourth terminator 911 are adjusted so that their sum is equal to the combined impedance value Zo' of the second and fourth transmission lines 906a and 906b (Rin18+Rin28≈Zo'). Accordingly, it can be thought that the combined impedance of the second and fourth transmission lines 906a and 906b is the constant value Zo'.

The resistance value Rout18 of the first terminator 920 and the resistance value Rout28 of the third terminator 921 are adjusted to the values calculated based on the following equations (21) and (22). The following equations (21) and (22) show the conditions where the combined resistance value Rt8 in the output side viewed from the first and third transmission lines 900a and 900b matches with the combined input impedance Zo of the first and third transmission lines 900a and 900b. Since the signal receiving circuit 9 has the differential signal receiving circuit 904, there are two different impedances of differential impedance and common-mode impedance. In the combined input impedance Zo of the first and third transmission lines 900a and 900b, the differential impedance is Zd8, and the common-mode impedance is Zcom8. In the combined resistance value Rt8, the differential resistance value is Rt8d, and the common-mode resistance value is Rt8com. The following equation (21) is the conditional expression that matches the differential resistance value Rt8d with the differential impedance Zd8. The following equation (22) is the conditional expression matches the common-mode resistance value Rt8com with the common-mode impedance Zcom8.

Equation (21)
$$Rt8d = \frac{(Rin18 + Rin28) \times (Rout18 + Rout28)}{(Rin18 + Rin28) + (Rout18 + Rout28)} \approx Zd8 \qquad (21)$$

Equation (22)
$$Rt8com = \frac{\left(\frac{Rin18 \times Rin28}{Rin18 + Rin28}\right) \times \left(\frac{Rout18 \times Rout28}{Rout18 + Rout28}\right)}{\left(\frac{Rin18 \times Rin28}{Rin18 + Rin28}\right) + \left(\frac{Rout18 \times Rout28}{Rout18 + Rout28}\right)} \approx Zcom8 \qquad (22)$$

When the resistance value Rout18 of the first terminator 920 and the resistance value Rout28 of the third terminator 921 are adjusted so as to satisfy the above equations (21) and (22), the differential impedance and common-mode impedance over the entire transmission line can be set substantially to the constant values Zd8 and Zcom8. Therefore, it is possible to suppress reflection of signals and noise generated due to the reflection.

The impedance graph of FIG. 9 shows the relationship between the distance from the input end 907 or 908 in the signal transmission direction, and the impedance. The solid line represents the impedance of the signal receiving circuit 9 including the first, second, third and fourth terminators 920, 910, 921 and 911. The dashed line represents the differential or common-mode impedance in the cases where the first and third series resistors 920 and 921 are not provided. As shown by the solid line, even when the differential signal receiving circuit is used, the differential and common-mode impedances of the entire transmission line have the constant values Zd8 and Zcom8.

8-3. Effect

In this embodiment, in the signal receiving circuit including the differential signal receiving circuit, the combined differential and common-mode impedances Zd8 and Zcom8 of the first and third transmission lines 900a and 900b, and the combined resistance value Rt8d and Rtcom8 in the output side viewed from the first and third transmission lines 900a and 900b are adjusted with simple construction using the first, second, third and the fourth terminators 920, 910, 921 and 911. As a result, the differential and common-mode impedances of the entire transmission line are approximately constant, in transmission of two types of signals, it is also possible to prevent reflection of each signal, and to transmit stable, high quality signals without distorting the signal waveforms.

8-4. Alternative Example of Eighth Embodiment

Figure 10:
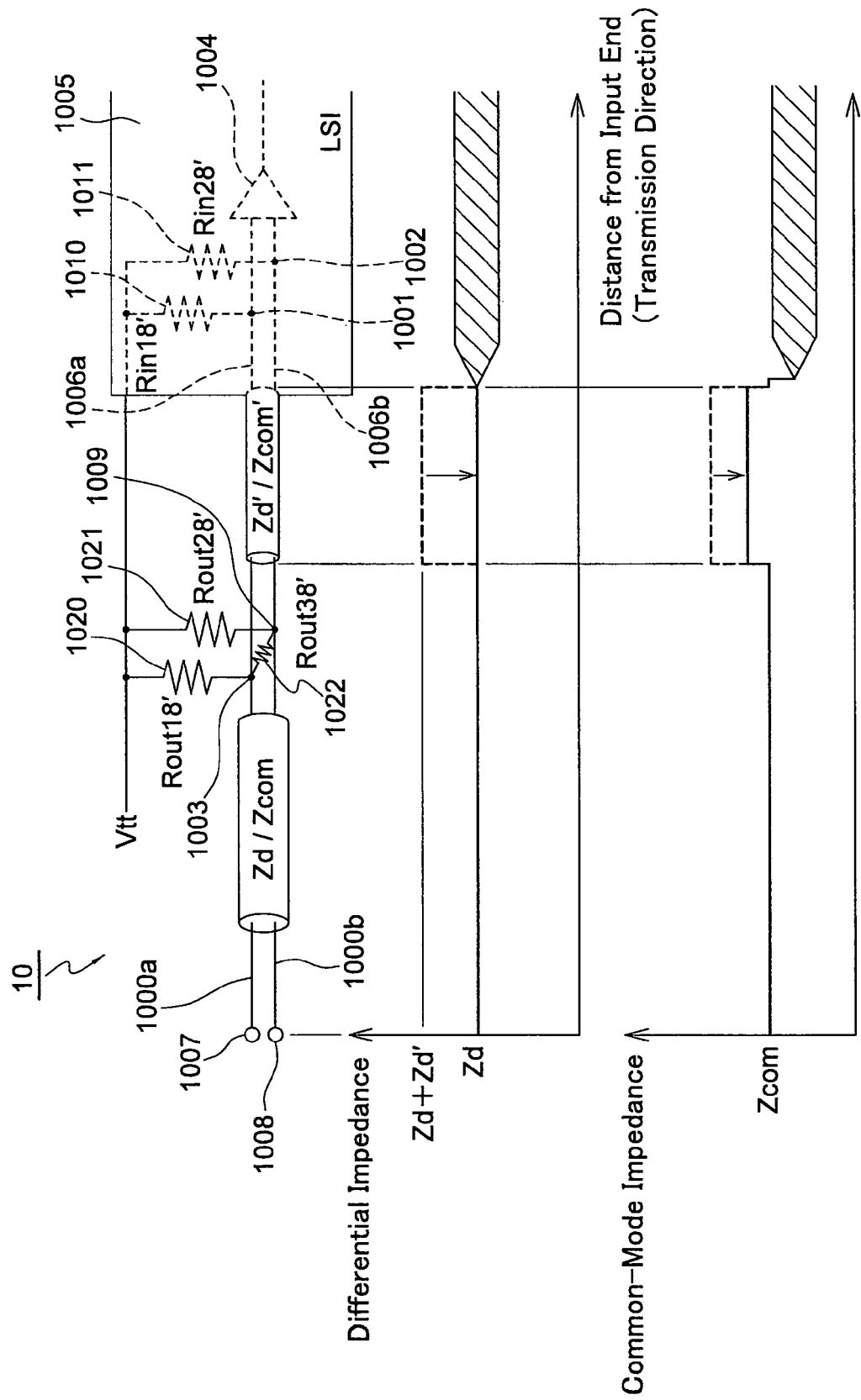
FIG. 10 shows a circuit diagram of a signal receiving circuit according to another example of the eighth embodiment, and an impedance graph thereof.

FIG. 10 shows a signal receiving circuit according an alternative example of the eighth embodiment, and an impedance graph thereof. The signal receiving circuit 10 includes a node 1003 on a first transmission line 1000a and a node 1009 on a third transmission line 1000b. The node 1003 is the connection point between the first transmission line 1000a and a first terminator 1020. The node 1009 is the connection point between the third transmission line 1000b and a third terminator 1021. A resistor 1022 is connected between the node 1003 and the node 1009. The other construction of this signal receiving circuit 10 is similar to the circuit of FIG. 9. The resistance values are adjusted so that the resistance values Rt8d' and Rt8com' in the output side viewed from the first and third transmission lines 1000a and 1000b matches with the combined differential and common-mode impedances Zd8' and Zcom8' of the first and third transmission lines 1000a and 1000b. The combined resistance values Rt8d' and Rt8com ' are the combined differential and common-mode impedances of the first to fourth terminators 1020, 1010, 1021 and 1011, the resistor 1022, the second and fourth transmission lines 1006a and 1006b. The adjusted resistance values are the respective resistance values Rout18', Rin18', Rout28' and Rin28' of the first to fourth terminators 1020, 1010, 1021 and 1011, and the resistance value Rout38 of the resistor 1022. That is, the resistance values Rin18' and Rin28' of the second and fourth terminators 1010 and 1011 are adjusted so that their sum is equal to the combined impedance value Zo' of the second and fourth transmission lines 1006a and 1006b (Rin18'+Rin28'≈Zo'). The resistance values Rout18' and Rout28' of the first and third terminators 1020 and 1021, and the resistance value Rout38' of the resistor 1022 are adjusted according to equations (23) and (24).

Equation (23)
$$Rt8d' = \left(\frac{Rout38' \times (Rout18' + Rout28') \times (Rin18' + Rin28')}{Rout38' + (Rout18' + Rout28') + (Rin18' + Rin28')}\right) = Zd8' \qquad (23)$$

Equation (24)
$$Rt8com' = \frac{\left(\frac{Rin18' \times Rin28'}{Rin18' + Rin28'}\right) \times \left(\frac{Rout18' \times Rout28'}{Rout18' + Rout28'}\right)}{\left(\frac{Rin18' \times Rin28'}{Rin18' + Rin28'}\right) + \left(\frac{Rout18' \times Rout28'}{Rout18' + Rout28'}\right)} \approx Zcom8' \qquad (24)$$

The impedance graph of FIG. 10 shows the relationship between the distance from an input end 1007 or 1008 in the signal transmission direction, and the impedance. The solid line represents the impedance of the signal receiving circuit 10 including the first, second, third and fourth terminators 1020, 1010, 1021 and 1011, and the resistor 1022. The dashed line represents the differential or common-mode impedance in the cases where the first and third series resistors 1020 and 1021, and the resistor 1022 are not provided. As shown by the solid line, even when the differential signal receiving circuit is provided, the differential and common-mode impedances of the entire transmission line have the constant values Zd8' and Zcom8'.

As mentioned above, an additional resistor can be added between the node 1003 on the first transmission line, and the node 1009 on the third transmission line. A plurality of the additional resistors may be added. Accordingly, since flexibility for adjusting the differential and common impedances of the entire transmission line increases, it is easy to achieve matching of the entire transmission line.

Ninth Embodiment 9-1. Construction

Figure 11:
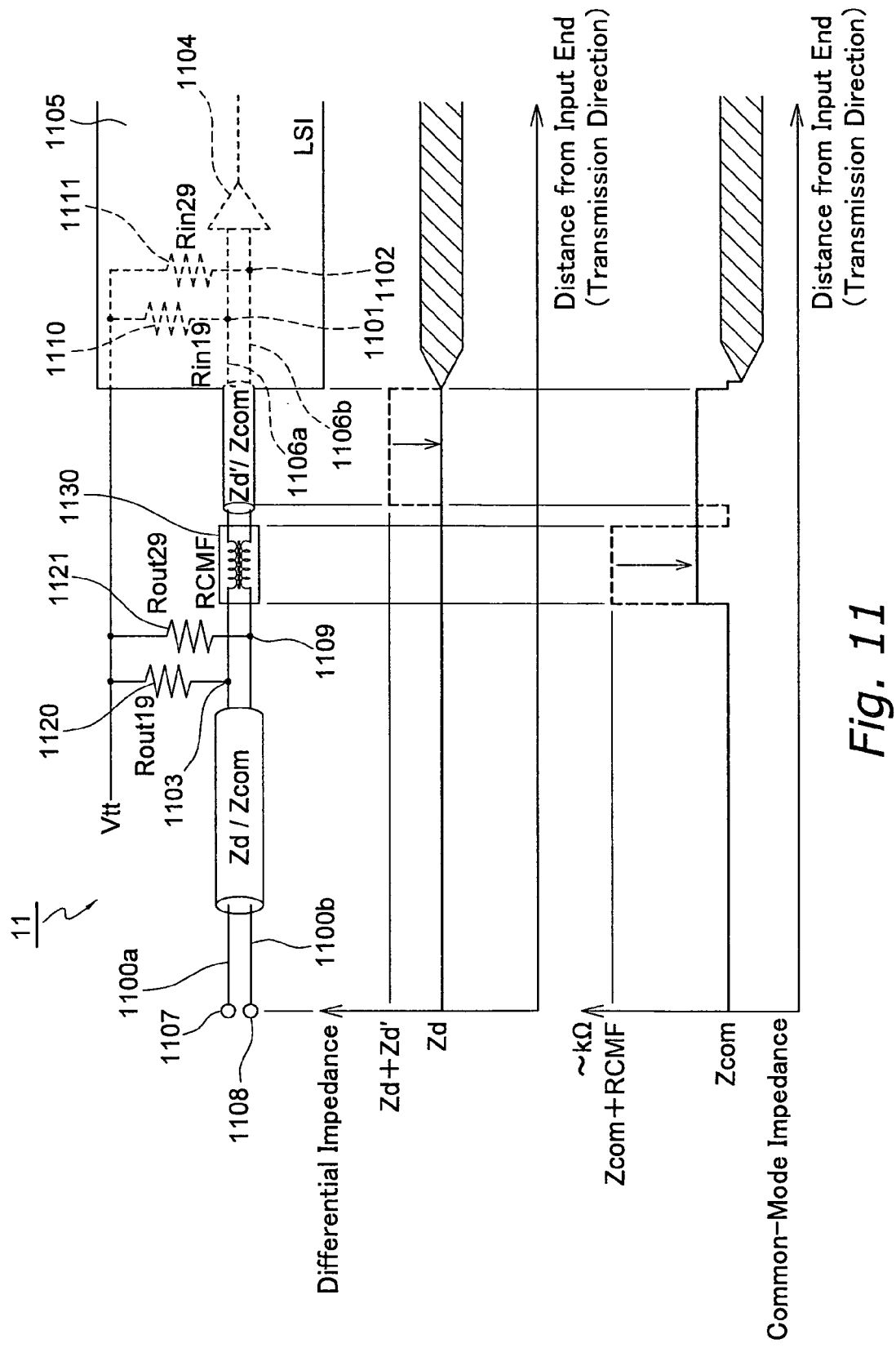
FIG. 11 shows a circuit diagram of a signal receiving circuit according to a ninth embodiment, and an impedance graph thereof.

FIG. 11 shows a schematic diagram of a signal receiving circuit according to a ninth embodiment of the present invention, and an impedance graph. The signal receiving circuit 11 of FIG. 11 has construction that includes a common-mode filter 1130 in addition to the signal receiving circuit 9 of FIG. 9. Generally, the common-mode filter is used to remove high voltage, high frequency noise due to static electricity or the like, and to prevent breakdown of the semiconductor device due to the high voltage, high frequency noise due to static electricity or the like. However, the common-mode filter has very high impedance characteristics. For this reason, with common-mode impedance, impedance is very high in a part where the common-mode filter is inserted.

In the signal receiving circuit 11, the common-mode filter 1130 is connected in series between the pairs of the first and third transmission lines 1100a and 1100b, and the second and fourth transmission lines 1106a and 1106b. The other construction of this signal receiving circuit 11 is similar to the eighth embodiment of FIG. 9. That is, a semiconductor device 1105 includes a differential signal receiving circuit 1104 for receiving two types of signals with phases inverted relative to each other. One input terminal of the differential signal receiving circuit 1104 is connected to the second transmission line 1106a. Another input terminal is connected to the fourth transmission line 1106b. The first transmission line 1100a and second transmission line 1106a are connected to each other in series. The third transmission line 1100b and fourth transmission line 1106b are connected to each other in series. A first terminator 1120 with value Rout19 is connected to the first transmission line 1100a in parallel, and is provided externally of the semiconductor device 1105. A second terminator 1110 with value Rin19 is connected to the second transmission line 1106a in parallel, and is provided inside the semiconductor device 1105. A third terminator 1121 is connected to the third transmission line 1100b in parallel, and is provided externally of the semiconductor device 1105. A fourth terminator 1111 with value Rin29 is connected to the fourth transmission line 1106b in parallel, and is provided inside the semiconductor device 1105. One end of each of the first to fourth terminators 1120, 1110, 1121 and 1111 is connected to the power supply Vtt. The potential of the power supply Vtt is not specifically limited, and may be grounded.

Since the distance between the first and third transmission lines 1100a and 1100b is very small, it can be thought that the combined impedance of the first and third transmission lines 1100a and 1100b is Zo. Since the distance between the second and fourth transmission lines 1106a and 1106b is very small, it can be thought that the combined impedance of the second and fourth transmission lines 1106a and 1106b is Zo'.

9-2. Impedance Matching

How impedance matching is achieved will now described in the signal receiving circuit 11 of FIG. 11. In the signal receiving circuit 11, the combined resistance value Rt9 in the output side viewed from the first and third transmission lines 1100a and 1100b matches with the combined input impedance Zo of the first and third transmission lines 1100a and 1100b (Rt9≈Zo). The combined resistance value Rt9 is the combined resistance value of the first to fourth terminators 1120, 1110, 1121 and 1111, the second and fourth transmission lines 1106a and 1106b, and the common-mode filter 1130. That is, in the signal receiving circuit 11, the following four resistance values which affect the combined resistance value Rt9 are adjusted so as to achieve impedance matching in the entire transmission line.

(a) The resistance value Rout19 of the first terminator 1120
(b) The resistance value Rin19 of the second terminator 1110
(c) The resistance value Rout29 of the third terminator 1121
(d) The resistance value Rin29 of the fourth terminator 1111

Specifically, first, the resistance values Rin19 and Rin29 of the second terminator 1110 and the fourth terminator 1111 are adjusted so that their sum is equal to the combined impedance value Zo' of the second and fourth transmission lines 1106a and 1106b (Rin19+Rin29≈Zo'). Accordingly, it can be thought that the impedance of the second and fourth transmission lines 1106a and 1106b is the constant value Zo'.

The resistance value Rout19 of the first terminator 1120 and the resistance value Rout28 of the third terminator 1121 are adjusted to the values calculated based on the following equations (25) and (26). The following equations (25) and (26) show the conditions where the combined resistance value Rt9 in the output side viewed from the first and third transmission lines 1100a and 1100b matches with the combined input impedance Zo of the first and third transmission lines 1100a and 1100b. Since the signal receiving circuit 11 has the differential signal receiving circuit 1104, there are two different impedances of differential impedance and common-mode impedance. In the combined input impedance Zo of the first and third transmission lines, the differential impedance is Zd9, and the common-mode impedance is Zcom9. In the combined resistance value Rt9, the differential resistance value is Rt9d, and the common-mode resistance value is Rt9com. The following equation (25) is the conditional expression for matching the differential resistance value Rt9d with the differential impedance Zd9. The following equation (26) is the conditional expression for matching the common-mode resistance value Rt9com with the common-mode impedance Zcom9.

Equation (25) (25)
$$Rt9d = \frac{(Rout19 + Rout29) \times (Rin19 + Rin29)}{Rout19 + Rout29 + Rin19 + Rin29} \approx Zd9$$

Equation (26) (26)
$$Rt9com = \frac{\left(\frac{Rout19 \times Rout29}{Rout19 + Rout29}\right) \times \left(\frac{Rin19 \times Rin29}{Rin19 + Rin29} + R_{CMF}\right)}{R_{CMF} + \left(\frac{Rout19 \times Rout29}{Rout19 + Rout29}\right) + \left(\frac{Rin19 \times Rin29}{Rin19 + Rin29}\right)} \approx Zcom9.$$

Where $R_{CMF}$ is the impedance of the common-mode filter.

When the resistance value Rout19 of the first terminator 1120 and the resistance value Rout29 of the third terminator 1121 are adjusted so as to satisfy the above equations (25) and (26), the differential impedance and common-mode impedance over the entire transmission line can be set substantially to the constant values Zd9 and Zcom9. Therefore, even in the cases where the common-mode filter is inserted, it is possible to suppress reflection of signals and noise generated due to the reflection.

The impedance graph of FIG. 11 shows the relationship between the distance from an input end 1107 or 1108 in the signal transmission direction, and the impedance. The solid line represents the differential or common-mode impedance of the signal receiving circuit 11 including the common-mode filter 1130, and the first, second, third, and fourth terminators 1120, 1110, 1121 and 1111. As shown by the solid line, in the signal receiving circuit 11, even when the common-mode filter 1130 is inserted, extreme rise of impedance of the transmission line due to insertion of the common-mode filter is reduced.

The dashed line represents the differential or common-mode impedance in the cases where the common-mode filter 1130 is included but the first and third series resistors 1120 and 1121 are not employed. In the cases where the first and third series resistors 1120 and 1121 are not employed, the impedance extremely rises in a part where a common-mode filter is inserted. The reason is that a common-mode filter has very high impedance characteristic.

9-3. Effect

In this embodiment, when the common-mode filter is inserted, the first, second, third and fourth terminators 1120, 1110, 1121 and 1111 are used. Accordingly, even when the common-mode filter is inserted, the differential impedance of the entire transmission line can be constant. In addition, the impedances of the entire transmission line and the common-mode filter can be substantially constant. Therefore, reflection of a signal, from which high voltage, high frequency noise due to static electricity or the like is removed, can be prevented, and the signal can be transmitted in a high quality state with the common-mode filter.

Other Embodiments

Figure 12:
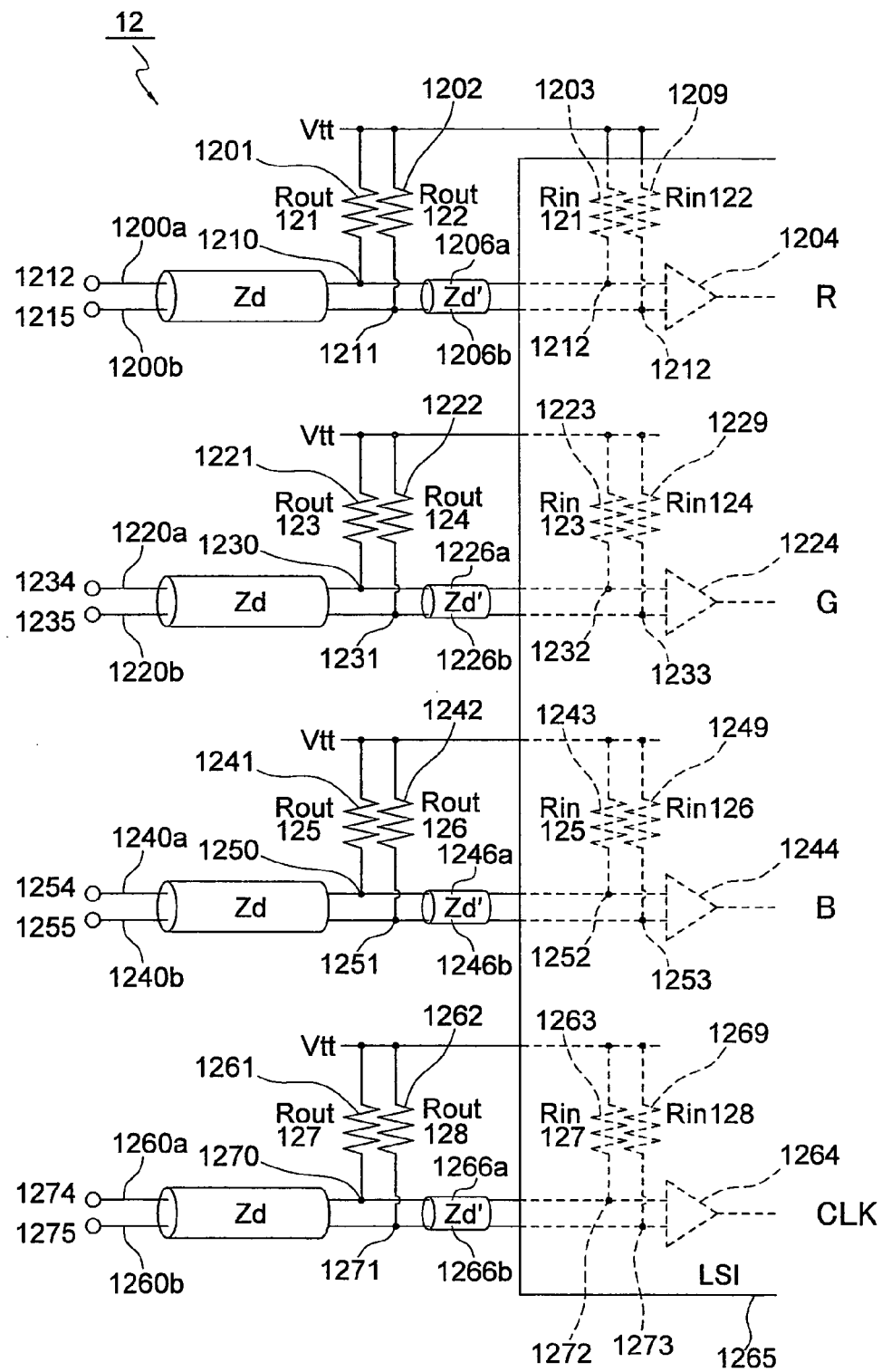
FIG. 12 is an example in which the present invention is applied to a display.
Figure 13:
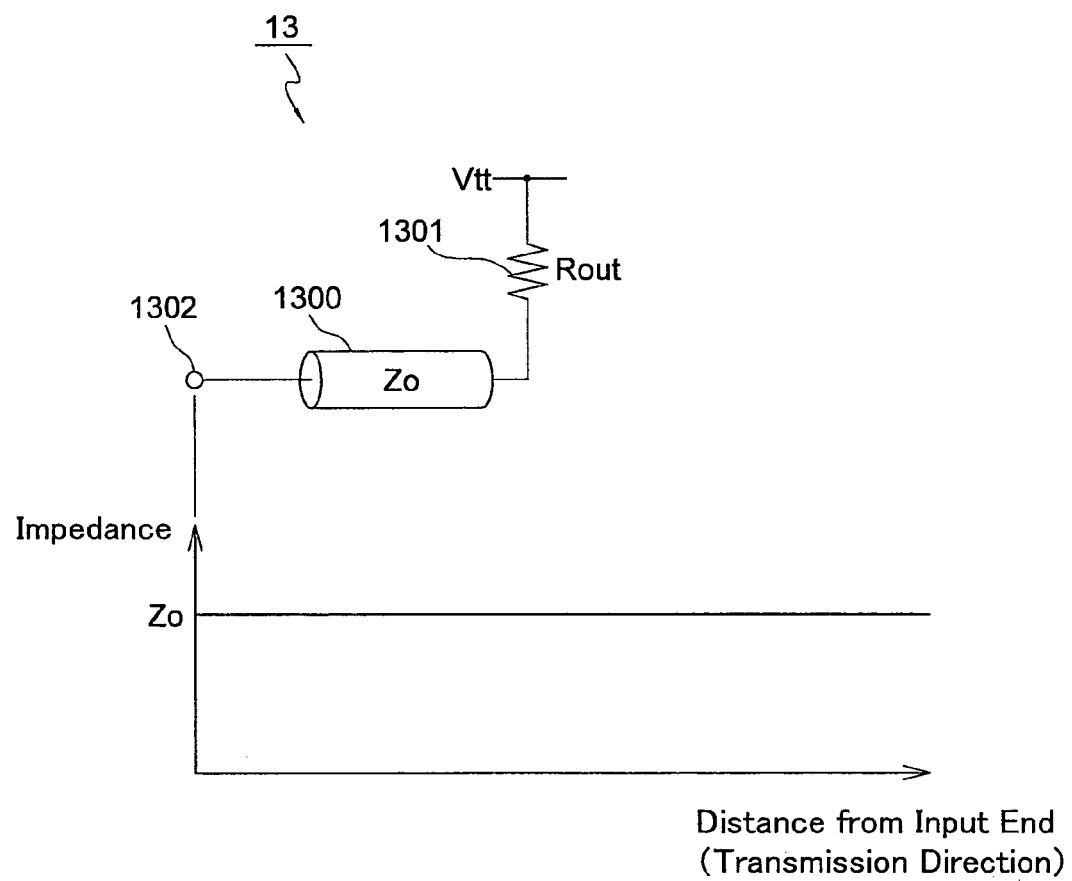
FIG. 13 shows a conceptual diagram of impedance-matching technology.
Figure 14:
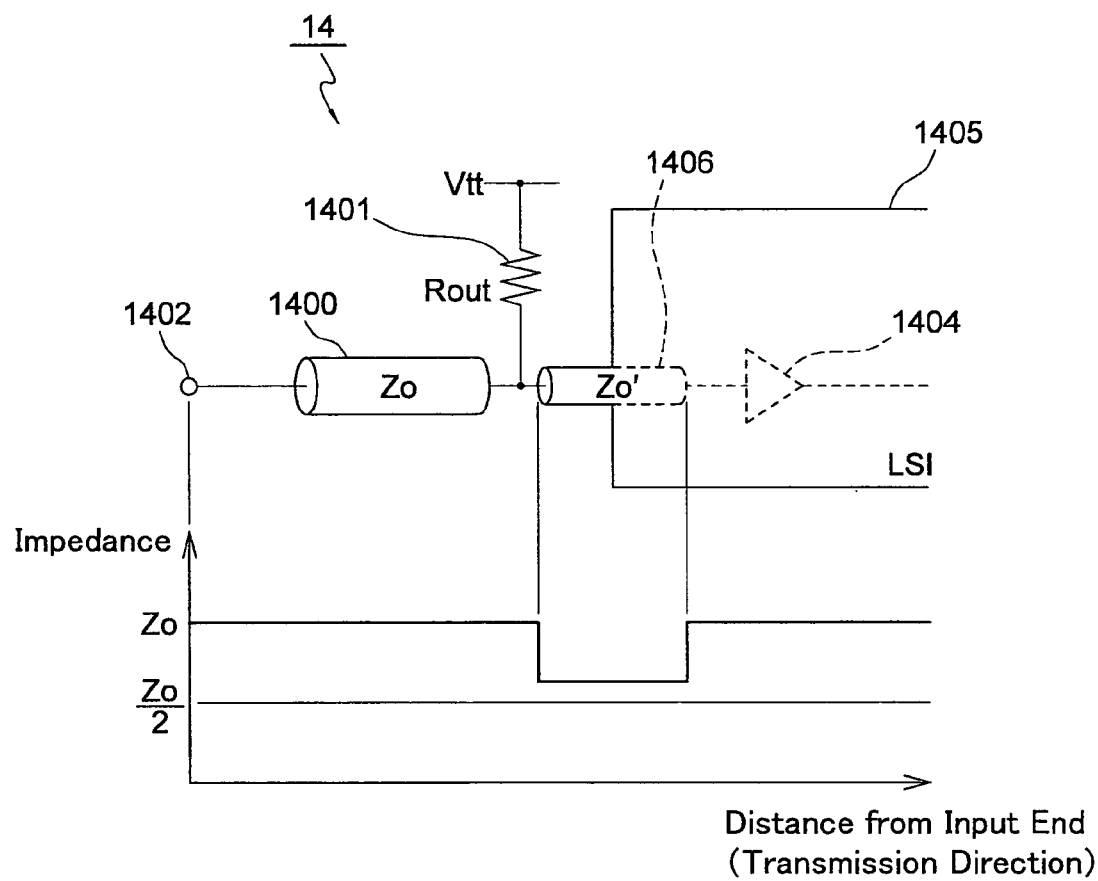
FIG. 14 shows a diagram of a impedance-matching method by an externally-provided terminator.
Figure 15:
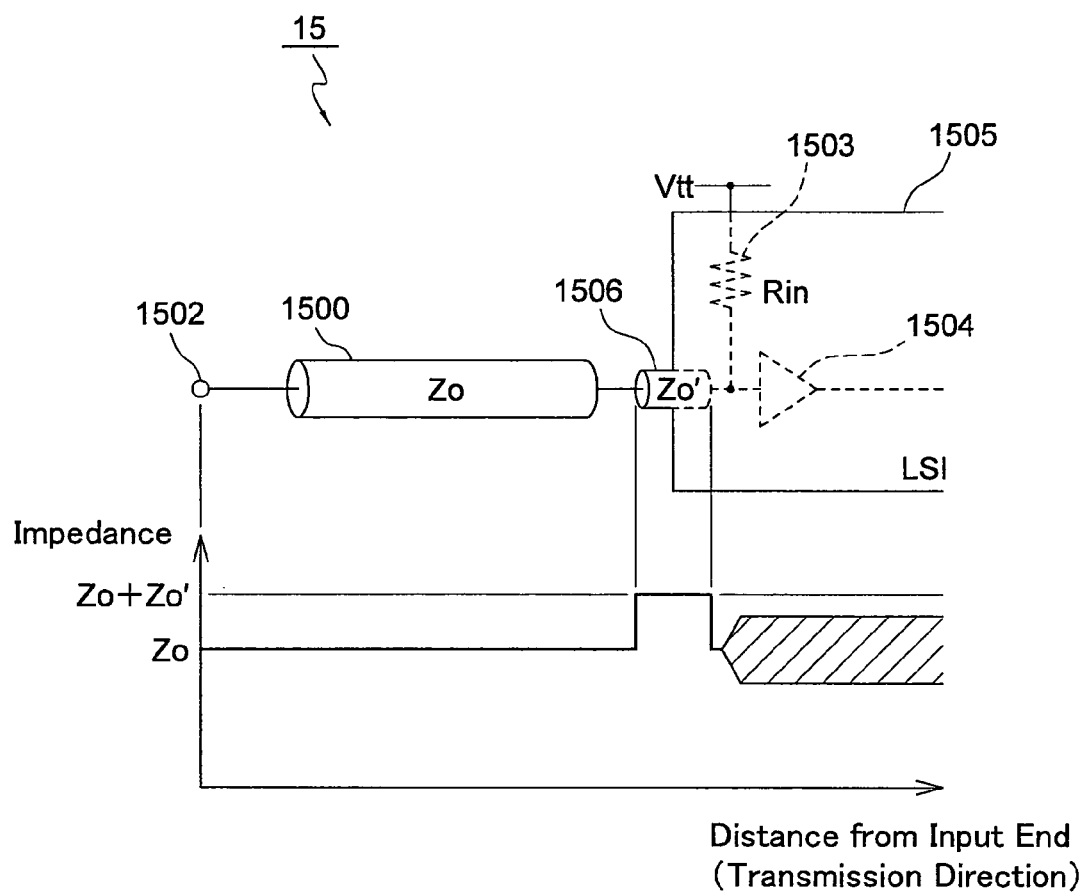
FIG. 15 shows a diagram of impedance-matching method by a semiconductor device in which a terminator is internally provided.
Figure 16:
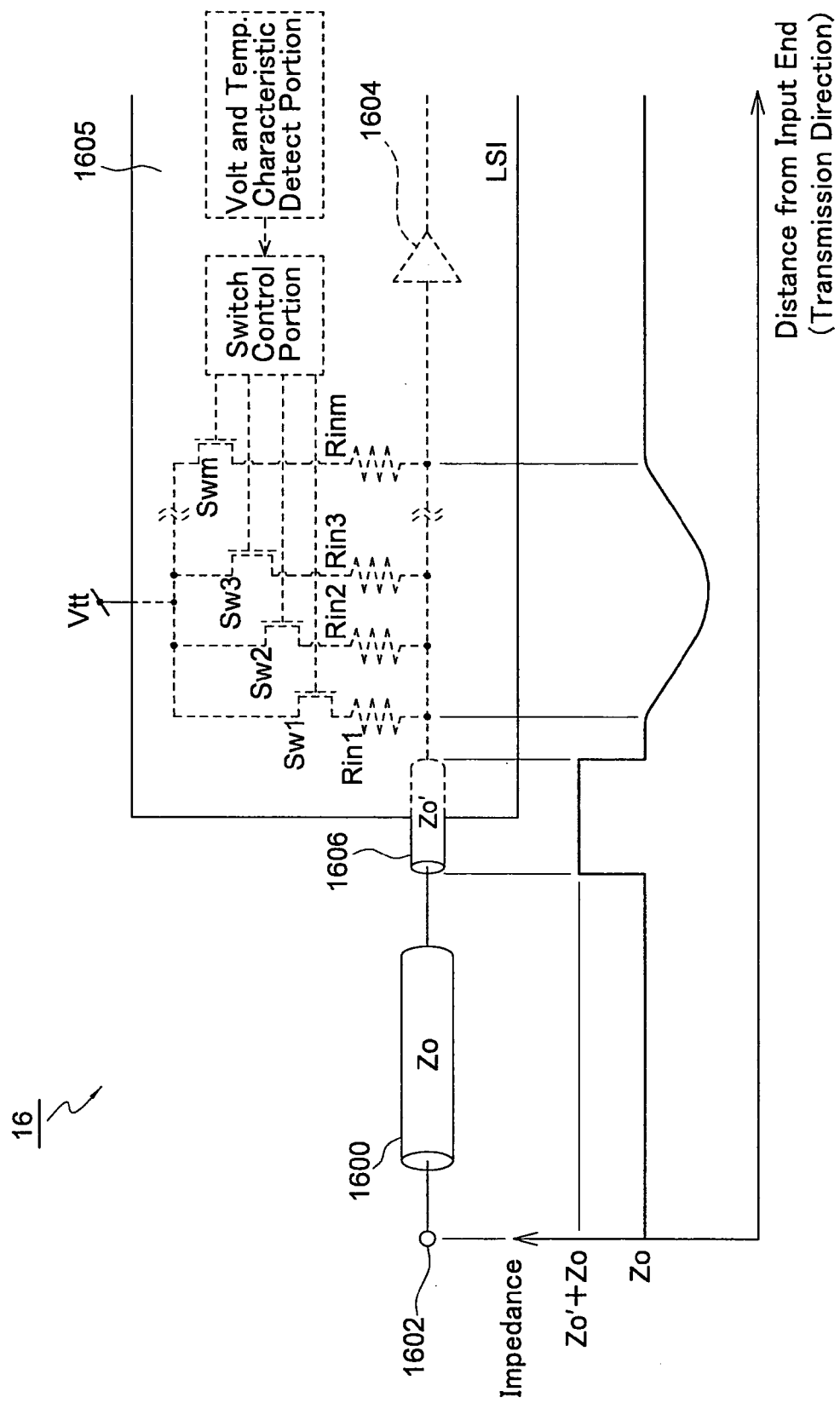
FIG. 16 shows an impedance-matching circuit according to Japanese unexamined patent application publication 2002-344300.

FIG. 12 shows an example where the signal receiving circuit 9 shown in the eighth embodiment is applied to a display. The signal receiving circuit in a transmission system of TMDS (Transition Minimised Differential Signaling) used in a high-speed differential serial interface, such as DVI and HDMI, is suitable for reproduction/output unit of audio and video. FIG. 12 shows differential line construction with four channels of R, G, B, and CLK. Description about the concrete construction and operation of FIG. 12 is omitted.

Accordingly, when the present invention is applied to an apparatus which transmits audio and video information such as a display, it is possible to transmit audio and video signals in a high quality state. Therefore, it is possible to provide an audio and video receiving apparatus with excellent audio and video quality.

As mentioned above, the signal receiving circuit according to the present invention is applicable to DVD recorder, television, or video recorder.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A signal receiving circuit comprising:
first and second transmission lines which are connected to each other in series;
a semiconductor device which receives a signal through the first and second transmission lines;
a first terminator which is connected to the first transmission line in parallel and provided externally of the semiconductor device; and
a second terminator which is connected to the second transmission line in parallel and provided inside the semiconductor device;
wherein the respective resistance values Rout and Rin of the first and second terminators are adjusted so that the combined resistance value Rt1 of: the first terminator; the second terminator; and the impedance of the second transmission line matches with the impedance value Zo of the first transmission line.

2. A signal receiving circuit comprising:
first and second transmission lines which are connected to each other in series;
a semiconductor device which receives a signal through the first and second transmission lines;
a first terminator which is connected to the first transmission line in parallel and provided externally of the semiconductor device; and
a second terminator which is connected to the second transmission line in parallel and provided inside the semiconductor device
wherein the second transmission line comprises a first series resistor which is connected in series to and provided externally of the semiconductor device; and
the respective resistance values Rout, Rin and Rs1 of the first and second terminators and the first series resistor are adjusted so that the combined resistance value Rt2 of the first and second terminators, the impedance of the second transmission line, and the first series resistor matches with the impedance value Zo of the first transmission line.

3. A signal receiving circuit comprising:
first and second transmission lines which are connected to each other in series;
a semiconductor device which receives a signal through the first and second transmission lines;
a first terminator which is connected to the first transmission line in parallel and provided externally of the semiconductor device; and
a second terminator which is connected to the second transmission line in parallel and provided inside the semiconductor device
wherein the first transmission line comprises a second series resistor which is connected in series to the second transmission line; and
the respective resistance values Rout, Rin and Rs2 of the first and second terminators, and the second series resistor are adjusted so that the combined resistance value Rt3 of the first and second terminators, the impedance of the second transmission line, and the second series resistor matches with the impedance value Zo of the first transmission line.

4. The signal receiving circuit according to claim 1, wherein the circuit further comprises a first electrostatic discharge protection component which is connected to the second transmission line in parallel and provided externally of the semiconductor device.

5. The signal receiving circuit according to claim 1, wherein the circuit further comprises a second electrostatic discharge protection component which is connected to the first transmission line in parallel.

6. An audio and video receiving apparatus comprising the signal receiving circuit according to claim 1, and a controller which provides a signal received by the signal receiving circuit to an output device.

* * * * *

UNITED STATES PATENT AND TRADEMARK OFFICE
CERTIFICATE OF CORRECTION

PATENT NO.         : 7,212,028 B2                                    Page 1 of 1
APPLICATION NO. : 11/038436
DATED              : May 1, 2007
INVENTOR(S)        : Osamu Shibata et al.

It is certified that error appears in the above-identified patent and that said Letters Patent is hereby corrected as shown below:

TITLE PAGE
Item (57), Abstract, line 1, "lines and are connected" should read --lines are connected--.

Signed and Sealed this

Sixth Day of November, 2007

JON W. DUDAS
*Director of the United States Patent and Trademark Office*